(12) United States Patent
Yao

(10) Patent No.: US 11,973,213 B2
(45) Date of Patent: Apr. 30, 2024

(54) SOLID-STATE ELECTRODE HAVING INTEGRATED SULFIDE SEPARATOR

(71) Applicant: EnPower, Inc., Indianapolis, IN (US)

(72) Inventor: Adrian Yao, Phoenix, AZ (US)

(73) Assignee: EnPower, Inc., Indianapolis, IN (US)

( * ) Notice: Subject to any disclaimer, the term of this patent is extended or adjusted under 35 U.S.C. 154(b) by 0 days.

(21) Appl. No.: 17/703,719

(22) Filed: Mar. 24, 2022

(65) Prior Publication Data

US 2023/0011811 A1 Jan. 12, 2023

Related U.S. Application Data

(63) Continuation of application No. 17/384,433, filed on Jul. 23, 2021.

(60) Provisional application No. 63/219,260, filed on Jul. 7, 2021.

(51) Int. Cl.
| | | |
|---|---|---|
| H01M 4/36 | (2006.01) | |
| H01M 4/04 | (2006.01) | |
| H01M 4/38 | (2006.01) | |
| H01M 4/50 | (2010.01) | |
| H01M 4/505 | (2010.01) | |
| H01M 4/52 | (2010.01) | |
| H01M 4/525 | (2010.01) | |
| H01M 4/62 | (2006.01) | |
| H01M 4/66 | (2006.01) | |
| H01M 10/05 | (2010.01) | |

(Continued)

(52) U.S. Cl.
CPC ......... *H01M 4/364* (2013.01); *H01M 4/0404* (2013.01); *H01M 4/043* (2013.01); *H01M 4/382* (2013.01); *H01M 4/505* (2013.01); *H01M 4/525* (2013.01); *H01M 4/661* (2013.01); *H01M 10/0525* (2013.01); *H01M 10/0562* (2013.01); *H01M 4/622* (2013.01)

(58) Field of Classification Search
None
See application file for complete search history.

(56) References Cited

U.S. PATENT DOCUMENTS

| | | | |
|---|---|---|---|
| 9,005,817 B2 * | 4/2015 | Ichikawa | H01M 4/13 429/231.95 |
| 2022/0181684 A1 * | 6/2022 | Xu | H01M 10/0565 |

FOREIGN PATENT DOCUMENTS

| | | | | |
|---|---|---|---|---|
| JP | 2019117768 | * | 7/2019 | ............. Y02E 60/10 |

* cited by examiner

*Primary Examiner* — Barbara L Gilliam
*Assistant Examiner* — Angela J Martin
(74) *Attorney, Agent, or Firm* — Kolitch Romano Dascenzo Gates LLC

(57) ABSTRACT

In general, a solid-state electrode includes an electrode composite layer comprising a plurality of active material particles mixed with a solid electrolyte buffer material comprising a first plurality of solid electrolyte particles layered onto and directly contacting a current collector foil, and an electrically non-conductive separator layer comprising a second plurality of solid electrolyte particles layered onto and directly contacting the electrode composite layer. In some examples, an interpenetrating boundary layer is disposed between the electrode composite layer and the electrically non-conductive separator layer. In some examples, the electrode composite layer includes one or more conductive additives intermixed with the plurality of active material particles, and the electrode composite layer (Continued)

is electrically conductive. In some examples, the electrode composite layer is adhered together by a binder.

10 Claims, 14 Drawing Sheets

(51) Int. Cl.
*H01M 10/0525* (2010.01)
*H01M 10/0562* (2010.01)

SOLID-STATE ELECTRODE HAVING INTEGRATED SULFIDE SEPARATOR

CROSS-REFERENCES

The following applications and materials are incorporated herein, in their entireties, for all purposes: U.S. Provisional Patent Application Ser. No. 63/219,260, filed Jul. 7, 2021; U.S. patent application Ser. No. 17/384,433 filed Jul. 23, 2021.

FIELD

This disclosure relates to systems and methods for solid-state electrochemical cells. More specifically, the disclosed embodiments relate to separators for solid-state electrochemical cells.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium-ion polymer (Li-ion polymer).

SUMMARY

The present disclosure provides systems, apparatuses, and methods relating to separators for solid-state electrochemical cells.

In some examples, a method of manufacturing a cathode for a solid-state electrochemical cell includes: depositing a first electrically conductive cathode composite slurry layer including a plurality of first cathode active material particles, a first plurality of solid electrolyte buffer particles, and a first binder material, onto an aluminum substrate; depositing a second electrically non-conductive separator slurry layer including a second plurality of solid electrolyte buffer particles and a second binder material onto the first electrically conductive cathode composite slurry layer; and forming interpenetrating fingers between the first electrically conductive cathode composite layer and the second electrically non-conductive separator slurry layer.

In some examples, a method of manufacturing a cathode for a solid-state electrochemical cell includes: depositing a first electrically conductive cathode composite slurry layer including a plurality of first cathode active material particles, a first plurality of solid electrolyte buffer particles, and a first binder material, onto a substrate; depositing a second electrically non-conductive separator slurry layer including a second plurality of solid electrolyte buffer particles and a second binder material onto the first electrically conductive cathode composite slurry layer; depositing a third electrically non-conductive separator slurry layer including a third plurality of solid electrolyte buffer particles and a third binder material onto the second electrically non-conductive separator slurry layer; forming first interpenetrating fingers between the first electrically conductive cathode composite layer and the second electrically non-conductive separator slurry layer; and forming second interpenetrating fingers between the second electrically non-conductive separator slurry layer and the third electrically non-conductive separator slurry layer.

In some examples, a method of manufacturing an electrochemical cell includes: depositing a first electrically conductive electrode slurry layer including a plurality of first active material particles, a first plurality of solid electrolyte buffer particles, and a first binder material, onto a substrate; depositing a second electrically non-conductive separator slurry layer including a second plurality of solid electrolyte buffer particles and a second binder material onto the first electrically conductive electrode slurry layer; depositing a third electrically conductive electrode slurry layer including a plurality of second active material particles, a third plurality of solid electrolyte buffer particles and a third binder material onto the second electrically non-conductive separator slurry layer; forming first interpenetrating fingers between the first electrically conductive electrode slurry layer and the second electrically non-conductive separator slurry layer; and forming second interpenetrating fingers between the second electrically non-conductive separator slurry layer and the third electrically conductive electrode slurry layer.

Features, functions, and advantages may be achieved independently in various embodiments of the present disclosure, or may be combined in yet other embodiments, further details of which can be seen with reference to the following description and drawings.

DETAILED DESCRIPTION

Figure 1:
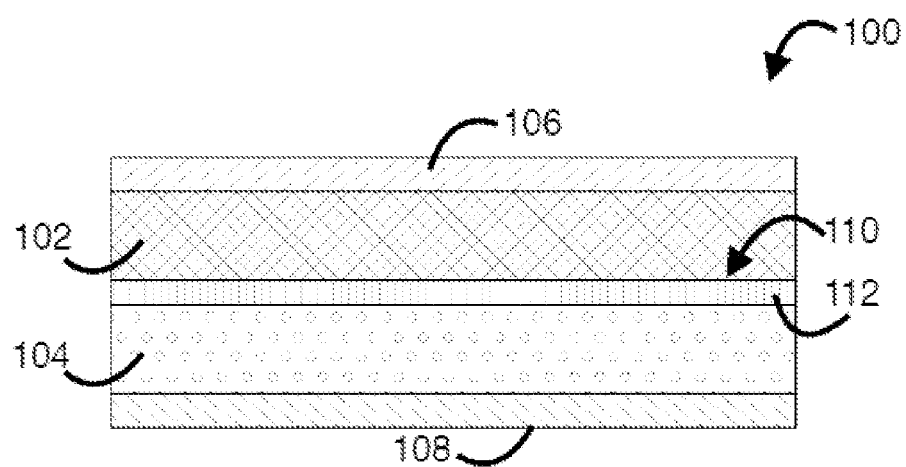
FIG. 1 is a schematic sectional view of an illustrative electrochemical cell.

Various aspects and examples of a solid-state electrode having an integrated sulfide separator, as well as related methods, are described below and illustrated in the associated drawings. Unless otherwise specified, a solid-state electrode in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"NCA" means Lithium Nickel Cobalt Aluminum Oxide ($LiNiCoAlO_2$).

"NMC" or "NCM" means Lithium Nickel Cobalt Manganese Oxide ($LiNiCoMnO_2$).

"LFP" means Lithium Iron Phosphate ($LiFePO_4$).

"LMO" means Lithium Manganese Oxide ($LiMn_2O_4$).

"LNMO" means Lithium Nickel Manganese Spinel ($LiNi_{0.5}Mn_{1.5}O_4$).

"LCO" means Lithium Cobalt Oxide ($LiCoO_2$).

"LTO" means Lithium Titanate ($Li_2TiO_3$).

"NMO" means Lithium Nickel Manganese Oxide ($Li(Ni_{0.5}Mn_{0.5})O_2$).

"LLZO" means Lithium Lanthanum Zirconium Oxide ($Li_7La_3Zr_2O_{12}$).

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, solid-state electrodes according to aspects of the present disclosure comprise an electrode composite layer layered onto and directly contacting a current collector foil. The electrode composite layer comprises a plurality of active material particles mixed with a solid electrolyte buffer material comprising a first plurality of solid electrolyte particles. In some examples, the electrode composite layer includes one or more conductive additives intermixed with the plurality of active material particles, and the electrode composite layer is electrically conductive. In some examples, the electrode composite layer is adhered together by a binder. An electrically non-conductive separator layer comprising a second plurality of solid electrolyte particles is layered onto and directly contacting the electrode composite layer. In some examples, an interpenetrating boundary layer is disposed between the electrode composite layer and the electrically non-conductive separator layer.

In some examples, the solid electrolyte buffer material of the electrode composite layer and the solid electrolyte particles of the electrically non-conductive separator layer comprise a sulfide ceramic material. Sulfide ceramics are solid lithium-ion conductors which have high room temperature conductivities, which may in some examples be on-par with lithium-ion conductivities found in liquid electrolytes. Sulfide ceramics may also easily be "cold-sintered" by hot pressing under moderate temperatures. In contrast, other oxide-based ceramics utilized as solid electrolytes (e.g., LLZO) require sintering temperatures greater than 1000° C. Sintering the sulfide ceramic particles may create dense, low impedance electrode and separator layers with low or zero porosity. The first plurality of solid electrolyte particles and the second plurality of solid electrolyte particles may comprise any suitable sulfide ceramic material, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}Ti_{1.46}(PO_4)_3$, $Li_{1.5}Al_{0.5}Ge_{1.5}(PO_4)_3$, $Li_{3.25}P_{0.95}S_4$, and/or the like. In some examples, the first plurality of solid electrolyte particles and the second plurality of solid electrolyte particles comprise a same ceramic material. In some examples, the second plurality of solid electrolyte particles may be configured to have a higher reductive stability with lithium than the first plurality of solid electrolyte particles. In some examples, the second plurality of solid electrolyte particles may be configured to form stable passivating layers with lithium. In some examples, the first plurality of solid electrolyte particles may be configured to have a higher oxidative stability when directly contacting cathode active materials than the second plurality of solid electrolyte particles.

In some examples, a solid-state electrode according to the present disclosure includes a current collector substrate, a first electrically conductive composite layer comprising a plurality of active material particles and a first sulfide solid electrolyte buffer material, a second nonconductive composite layer comprising a second sulfide solid electrolyte buffer material, and a third nonconductive composite layer comprising a third sulfide solid electrolyte buffer material. In some examples, the sulfide solid electrolyte materials included in the electrode layers are selected to improve electrochemical stability in various regions of an electrochemical cell including the electrode. The sulfide materials selected for inclusion in each layer are configured to have increased stability for their location within the cell.

In some examples, the first plurality of solid electrolyte particles and the second plurality of solid electrolyte particles have an average grain size less than an average particle size of the plurality of active material particles. In some examples, the first plurality of solid electrolyte particles are larger than the second plurality of solid electrolyte particles. In some examples, the second plurality of solid electrolyte particles are larger than the first plurality of solid electrolyte particles. In some examples, the first plurality of solid electrolyte particles have an average diameter ranging from 50 nm to 50 µm. In some examples, the second plurality of solid electrolyte particles have an average diameter ranging from 50 nm to 50 µm.

Solid-state electrodes as described above may be anodes and/or cathodes. In some examples, solid-state electrodes having integrated sulfide separators are cathodes, and comprise lithiated transition metal oxide active materials. In some examples, solid-state electrodes having integrated sulfide separators are anodes, and comprise silicon or graphite active materials.

Solid-state electrodes as described above may be included within solid-state lithium-ion batteries. In some examples, solid-state lithium-ion batteries according to aspects of the present disclosure comprise a metallic lithium anode and a composite cathode. The composite cathode comprises a plurality of cathode active material particles interspersed with a solid electrolyte buffer material. In some examples, the plurality of cathode active material particles comprise a lithiated transition metal oxide material, such as NCA, NMC, LFP, LMO, LNMO, LCO, LTO, NMO, and/or the like. The composite cathode is electrically conductive, as the composite cathode includes conductive additives mixed with the cathode active material particles and the solid electrolyte material. In some examples, the composite cathode is adhered together by a binder material. In some examples, the metallic lithium anode is disposed on and directly contacting a copper current collector. In some examples, the metallic lithium anode comprises a metallic lithium foil. In some examples, the metallic lithium anode is deposited in-situ onto the copper current collector. In some examples, the composite cathode is layered onto and directly contacting an aluminum current collector. An electrically non-conductive solid electrolyte separator layer is layered onto and directly contacting the composite cathode. In some examples, an interpenetrating boundary layer is disposed between the composite cathode and the electrically non-conductive solid electrolyte separator layer.

In some examples, a method of manufacturing a solid-state electrode having an integrated sulfide separator may include: providing a substrate material; depositing a first electrically conductive composite slurry layer comprising a plurality of active material particles, a plurality of solid electrolyte buffer material particles, and at least one binder material onto the substrate material; depositing a second electrically non-conductive separator slurry layer comprising a plurality of solid electrolyte buffer material particles and at least one binder; forming interpenetrating fingers between the first slurry layer and the second slurry layer; drying the first electrically conductive composite layer and the second electrically non-conductive separator layer; and hot compressing the first electrically conductive composite layer and the second electrically non-conductive separator layer. In some examples, the interpenetrating fingers have a length of at least 2 µm or a length at least twice the diameter of the solid electrolyte buffer material particles. In some examples, the first electrically conductive composite layer and the second electrically non-conductive separator layer are hot compressed at a temperature of 600° C. or less.

In some examples, a method of manufacturing a solid-state electrode having an integrated sulfide separator may include: coating a first electrically conductive composite layer comprising a plurality of active material particles and a first sulfide solid electrolyte buffer material onto a current collector; coating a second nonconductive composite layer comprising a second sulfide solid electrolyte buffer material onto the first electrically conductive composite layer; coating a third nonconductive composite layer comprising a third sulfide solid electrolyte buffer material onto the second nonconductive composite layer; forming interpenetrating fingers between the first composite layer and the second composite layer; forming interpenetrating fingers between the second composite layer and the third composite layer; drying the first, second, and third composite layers; and hot compressing the first, second, and third composite layers. In some examples, the method includes simultaneously coating the first, second, and third composite layers. In some examples, the interpenetrating fingers have a length of at least 2 µm or a length at least twice the diameter of the solid electrolyte buffer material particles. In some examples, the first, second, and third composite layers are hot compressed at a temperature of 600° C. or less.

In some examples, a method of manufacturing an electrochemical cell including an integrated sulfide separator may include; coating a conductive cathode layer including a plurality of first cathode active material particles mixed with a first plurality of solid sulfide electrolyte particles onto an aluminum foil substrate; coating a non-conductive sulfide separator layer including a second plurality of solid sulfide electrolyte particles onto the conductive cathode layer; coating a conductive anode layer including a plurality of first anode active material particles mixed with a third plurality of solid sulfide electrolyte particles onto the non-conductive separator layer; forming interpenetrating fingers between the conductive cathode layer and the non-conductive sulfide separator layer; forming interpenetrating fingers between the non-conductive sulfide separator layer and the conductive anode layer; drying the electrochemical cell layers; and hot compressing the electrochemical cell layers. In some examples, the conductive cathode layer, the non-conductive sulfide separator layer, and the conductive anode layer are coated simultaneously. In some examples, the interpenetrating fingers have a length of at least 2 μm or a length at least twice the diameter of the solid electrolyte buffer material particles. In some examples, the electrochemical cell layers are hot compressed at a temperature of 600° C. or less. In some examples, a copper foil substrate is laminated onto the conductive anode layer after the electrochemical cell is compressed. In some examples, the copper foil substrate is laminated onto the conductive anode layer while the electrochemical cell layers are hot compressed (e.g., roll compressed, cold-sintered, etc.). In some examples, the method includes first coating a conductive anode layer onto a copper foil substrate, coating a non-conductive sulfide separator layer onto the conductive anode layer, and coating a conductive cathode layer onto the non-conductive sulfide separator layer. In some examples, the method includes first coating a conductive cathode layer onto an aluminum foil substrate, coating a non-conductive sulfide separator layer onto the conductive cathode layer, and coating a conductive anode layer onto the non-conductive sulfide separator layer.

Examples, Components, and Alternatives

The following sections describe selected aspects of illustrative solid-state electrodes having integrated ceramic separators as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an electrochemical cell including an electrode of the present teachings. The electrochemical cell may be any bipolar electrochemical device, such as a battery (e.g. lithium-ion battery, secondary battery).

Referring now to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102, and current collector 108 is electrically coupled to anode 104. In some examples, current collector 106 comprises aluminum foil and current collector 108 comprises copper foil. The current collectors enable the flow of electrons, and thereby electrical current, into and out of each electrode. An electrolyte 110 disposed throughout the electrodes enables the transport of ions between cathode 102 and anode 104. In the present example, the electrolyte includes a solid-state ionic conductor. Electrolyte 110 may comprise any suitable sulfide ceramic material, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}Ti_{1.46}(PO_4)_3$, $Li_{1.5}Al_{0.5}Ge_{1.5}(PO_4)_3$, $Li_{3.25}P_{0.95}S_4$, and/or the like. Electrolyte 110 facilitates an ionic connection between cathode 102 and anode 104.

Electrolyte 110 is assisted by a separator 112, which physically partitions the space between cathode 102 and anode 104. Separator 112 enables the movement (flow) of ions between the two electrodes and insulates the two electrodes from each other. In some examples, separator 112 comprises a solid ion conducting material. Separator 112 may prevent dendritic growth through the electrochemical cell. As described further below, separator 112 may be integrated within one or both of cathode 102 and anode 104. In some embodiments, for example, separator 112 comprises a layer of sulfide ceramic particles applied to a top surface of an electrode (i.e., cathode 102 or anode 104), such that the sulfide particles of separator 112 are interpenetrated or intermixed with active material particles of cathode 102 or anode 104. In some examples, separator 112 comprises a same sulfide ceramic material as electrolyte 110.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, anode 104 includes lithium metal. On the other hand, cathode 102 may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

B. Illustrative Cathode Having an Integrated Sulfide Separator

Solid-state batteries, which include solid electrolytes instead of liquid or gel electrolytes, may suffer from low ionic conductivity. However, sulfide ceramics are solid lithium ion conductors with high room temperature conductivities when compared with alternative solid electrolytes. In some cases, sulfide ceramics have ionic conductivities which are on-par with lithium ion transport rates found in liquid electrolytes. Sulfide ceramics also have the ability to be "cold sintered" easily by hot pressing (AKA calendering) under moderate temperatures and high pressures. In contrast, oxide-based ceramics like LLZO, often require sintering temperatures of greater than 1000° C. Sulfide ceramics are suitable for use both as solid electrolyte materials due to their high ionic conductivity, and as porous separator particles, due to their high density and insulating properties.

Figure 2:
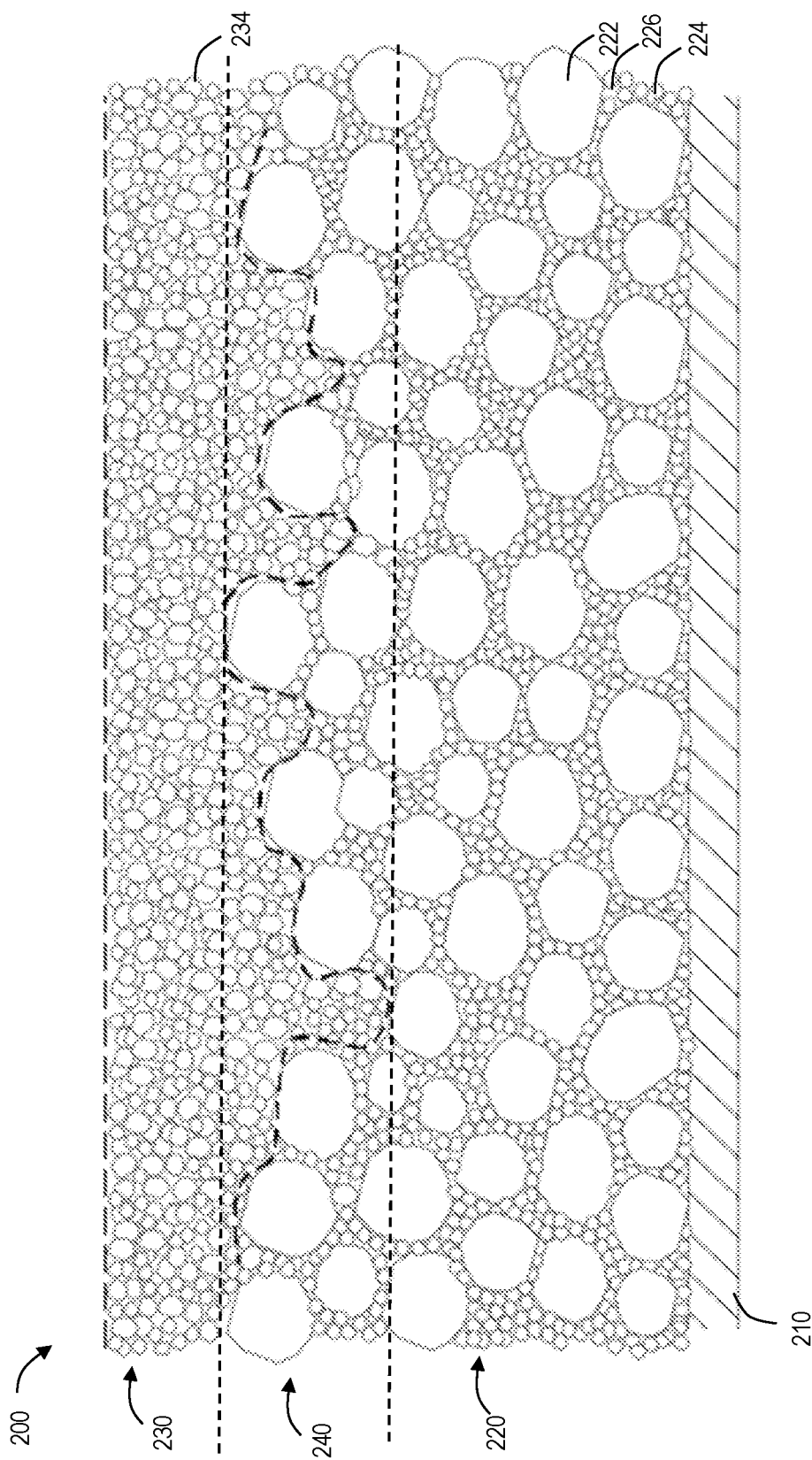
FIG. 2 is a schematic sectional view of an illustrative cathode having an integrated sulfide separator.

As shown in FIG. 2, this section describes an illustrative cathode 200 having an integrated sulfide separator. Cathode 200 includes an active material composite 220 layered onto an aluminum foil current collector 210. An integrated sulfide separator layer 230 is layered onto and directly contacting active material composite 220. Active material composite 220 includes a plurality of cathode active material particles 222 mixed with a first plurality of sulfide ceramic buffer particles 224. In some examples, active material composite 220 further includes a polymeric binder adhering the active material composite together. Active material composite 220 may be electrically conductive, and may include conductive additives (AKA conductive additive particles) 226 intermixed with active material particles 222 and sulfide ceramic buffer particles 224. The cathode active material particles 222 may comprise any suitable cathode active material, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides and chalcogenides, and/or the like. In some examples, cathode active material particles 222 comprise lithiated transition metal oxides, such as NCA, NMC, LFP, LMO, LNMO, LCO, LTO, NMO, and/or the like. In some examples, an average grain size of the first plurality of sulfide ceramic buffer particles 224 is less than an average particle size of the plurality of cathode active material particles 222.

Cathode 200 includes an integrated sulfide ceramic separator layer 230 layered onto and directly contacting active material composite 220. Integrated separator layer 230 includes a second plurality of sulfide ceramic buffer particles 234. In some examples, sulfide ceramic buffer particles 234 are adhered together by a binder. Integrated separator layer 230 is electrically non-conductive, and is configured to insulate active material composite 220 from a corresponding anode when cathode 200 is included within an electrochemical cell.

The first and second sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}$, $Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in active material composite 220 differ in composition from sulfide ceramic buffer particles included in integrated sulfide ceramic separator layer 230. In some examples, the second plurality of sulfide ceramic buffer particles 234 are configured to have a higher reductive stability with lithium than the first plurality of sulfide ceramic buffer particles. In some examples, the second plurality of sulfide ceramic buffer particles 234 are configured to form stable passivating layers with lithium metal. In some examples, the first plurality of sulfide ceramic buffer particles 224 have higher oxidative stability than the second plurality of sulfide ceramic buffer particles when directly contacting cathode active materials (e.g., cathode active material particles 222). In some examples, the first plurality of sulfide ceramic buffer particles have an average particle size greater than the second plurality of sulfide ceramic buffer particles. In some examples, the second plurality of sulfide ceramic buffer particles have an average particle size greater than the first plurality of sulfide ceramic buffer particles. In some examples, the first and second plurality of sulfide ceramic buffer particles have particle sizes ranging from 50 nm to 50 μm.

Figure 3:
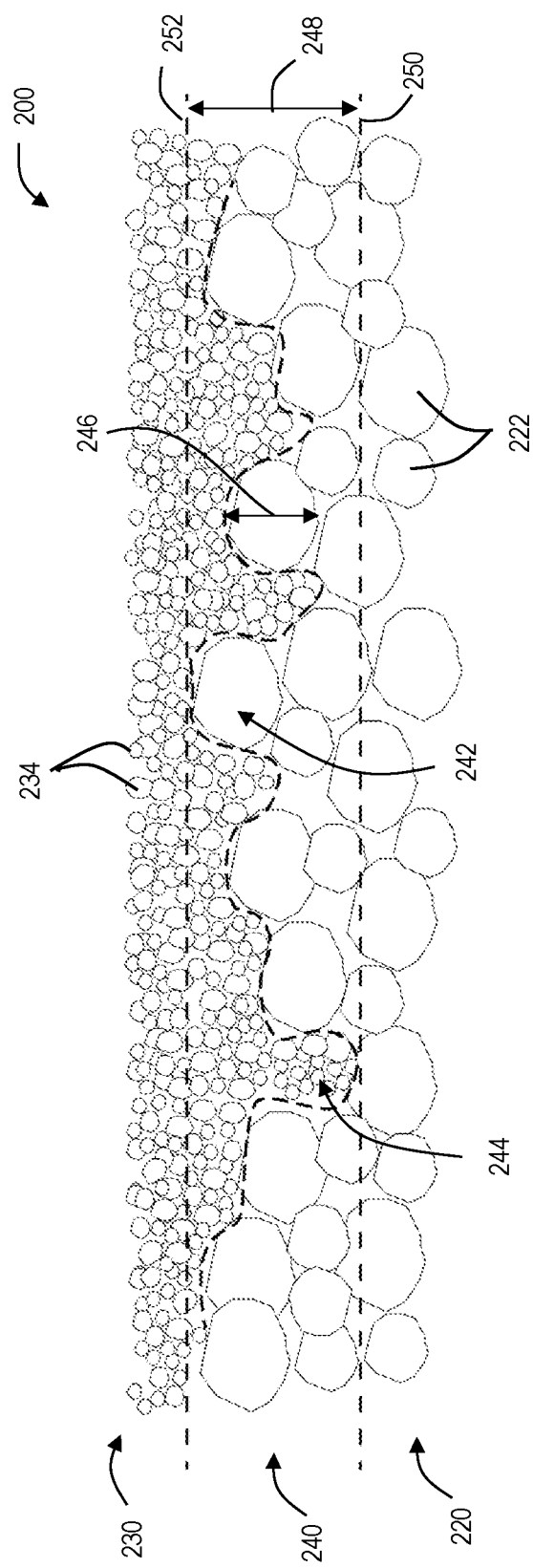
FIG. 3 is a sectional view of an interlocking region included within the illustrative cathode of FIG. 2.

In some examples, an interpenetrating boundary region (AKA interlocking region) 240 is disposed between active material composite 220 and integrated separator layer 230 (see FIG. 3). Interpenetrating boundary region 240 includes a non-planar boundary between active material composite 220 and integrated separator layer 230. Active material composite 220 and separator layer 230 have respective, three-dimensional, interpenetrating fingers 242 and 244 that interlock the two layers together, forming a mechanically robust interface that is capable of withstanding stresses, such as those due to electrode expansion and contraction, and separator shrinking. Additionally, the non-planar surfaces defined by fingers 242 and fingers 244 represent an increased total surface area of the interface boundary, which may provide reduced interfacial resistance and may increase ion mobility through the electrode. Fingers 242 and 244 may be interchangeably referred to as fingers, protrusions, extensions, projections, and/or the like. Furthermore, the relationship between fingers 242 and 244 may be described as interlocking, interpenetrating, intermeshing, interdigitating, interconnecting, interlinking, and/or the like.

Fingers 242 and fingers 244 are a plurality of substantially discrete interpenetrations, wherein fingers 242 are generally made up of the cathode active material particles 222 and fingers 244 are generally made up of sulfide ceramic buffer particles 234. The fingers are three-dimensionally interdigitated, analogous to an irregular form of the stud-and-tube construction of Lego bricks. Accordingly, fingers 242 and 244 typically do not span the electrode in any direction, such that a cross section perpendicular to that of FIG. 2 will also show a non-planar, undulating boundary similar to the one shown in FIG. 2. Interlocking region 240 may alternatively be referred to as a non-planar interpenetration of active material composite 220 and integrated sulfide ceramic separator layer 230, including fingers 242 interlocked with fingers 244.

As shown in FIG. 3, although fingers 242 and 244 may not be uniform in size or shape, the fingers may have an average or typical length 246. In some examples, length 246 of fingers 242 and 244 may fall in a range between two and five times the average particle size of the first active material layer or the separator layer, whichever is smaller. In some examples, length 246 of fingers 242 and 244 may have a length greater than two μm.

In the present example, a total thickness 248 of interlocking region 240 is defined by the level of interpenetration between the two electrode material layers (active material composite 220 and integrated sulfide ceramic separator layer 230). A lower limit 250 may be defined by the lowest point reached by separator layer 230 (i.e. by fingers 244). An upper limit 252 may be defined by the highest point reached by first active material layer 220 (i.e. by fingers 242). Total thickness 248 of interlocking region 240 may be defined as the separation or distance between limits 250 and 252. In some examples, the total thickness of interlocking region 240 may fall within one or more of various relative ranges, such as between approximately 200% (2×) and approximately 500% (5×), approximately 500% (5×) and approximately 1000% (10×), approximately 1000% (10×) and approximately 5000% (50×), and/or greater than approximately 5000% (50×) of the average particle size of the first active material layer or the separator layer, whichever is smaller.

In some examples, total thickness 248 of interlocking region 240 may fall within one or more of various absolute ranges, such as between approximately 500 and one thousand nanometers, one and approximately ten μm, approximately ten and approximately fifty μm, and/or greater than approximately fifty μm.

C. Illustrative Anode Having an Integrated Sulfide Separator

Figure 4:
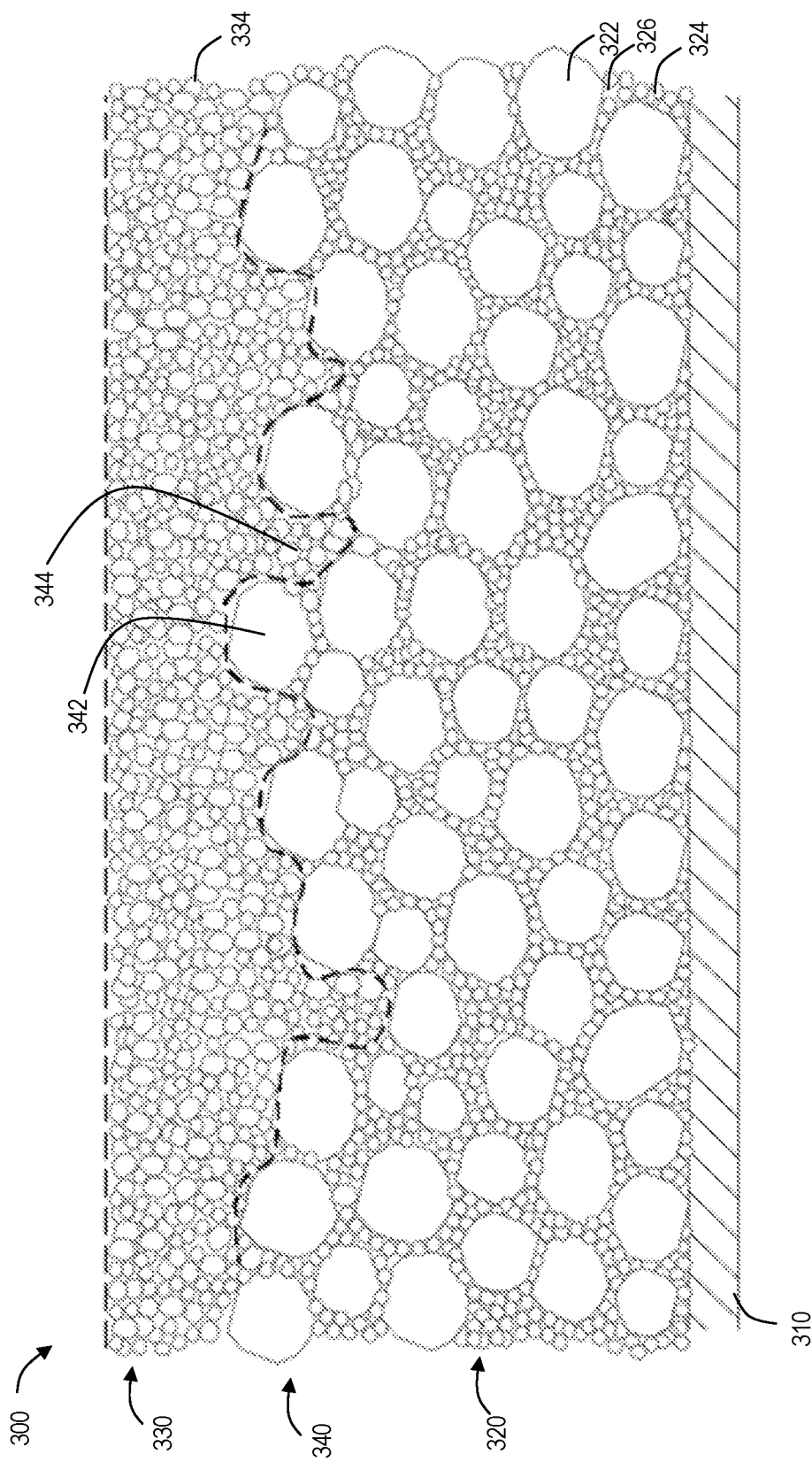
FIG. 4 is a schematic sectional view of an illustrative anode having an integrated sulfide separator.

As shown in FIG. 4, this section describes an illustrative anode 300 having an integrated sulfide separator. Anode 300 may be substantially identical to cathode 200, except as otherwise described.

Anode 300 includes an active material composite 320 layered onto a copper foil current collector 310. An integrated sulfide separator layer 330 is layered onto and directly contacting active material composite 320. Active material composite 320 includes a plurality of anode active material particles 322 mixed with a first plurality of sulfide ceramic buffer particles 324. In some examples, active material composite 320 further includes a polymeric binder adhering the active material composite together. Active material composite 320 may be electrically conductive, and may include conductive additives (AKA conductive additive particles) 326 intermixed with anode active material particles 322 and sulfide ceramic buffer particles 324. The anode active material particles 322 may comprise any suitable anode active material, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In some examples, the anode active material particles 322 comprise silicon and/or graphite. In some examples, an average grain size of the first plurality of sulfide ceramic buffer particles 324 is less than an average particle size of the plurality of anode active material particles 322.

Anode 300 includes an integrated sulfide ceramic separator layer 330 layered onto and directly contacting active material composite 320. Integrated separator layer 330 includes a second plurality of sulfide ceramic buffer particles 334. In some examples, sulfide ceramic buffer particles 334 are adhered together by a binder. Integrated separator layer 330 is electrically non-conductive, and is configured to insulate active material composite 320 from a corresponding cathode when anode 300 is included within an electrochemical cell.

The first and second sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}$ $Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in active material composite 320 differ in composition from sulfide ceramic buffer particles included in integrated sulfide ceramic separator layer 330. In some examples, the first plurality of sulfide ceramic buffer particles have an average particle size greater than the second plurality of sulfide ceramic buffer particles. In some examples, the second plurality of sulfide ceramic buffer particles have an average particle size greater than the first plurality of sulfide ceramic buffer particles. In some examples, the first and second plurality of sulfide ceramic buffer particles have particle sizes ranging from 50 nm to 50 μm.

In some examples, an interpenetrating boundary region (AKA interlocking region) 340 is disposed between active material composite 320 and integrated separator layer 330. Interpenetrating boundary region 340 may be substantially identical to interpenetrating boundary region 240 (see FIG. 3). Interpenetrating boundary region 340 includes a non-planar boundary between active material composite 320 and integrated separator layer 330. Active material composite 320 and separator layer 330 have respective, three-dimensional, interpenetrating fingers 342 and 344 that interlock the two layers together, forming a mechanically robust interface that is capable of withstanding stresses, such as those due to electrode expansion and contraction, and separator shrinking. Additionally, the non-planar surfaces defined by fingers 342 and fingers 344 represent an increased total surface area of the interface boundary, which may provide reduced interfacial resistance and may increase ion mobility through the electrode. Fingers 342 and 344 may be interchangeably referred to as fingers, protrusions, extensions, projections, and/or the like. Furthermore, the relationship between fingers 342 and 344 may be described as interlocking, interpenetrating, intermeshing, interdigitating, interconnecting, interlinking, and/or the like.

D. Illustrative Electrochemical Cell Having an Integrated Sulfide Separator

Figure 5:
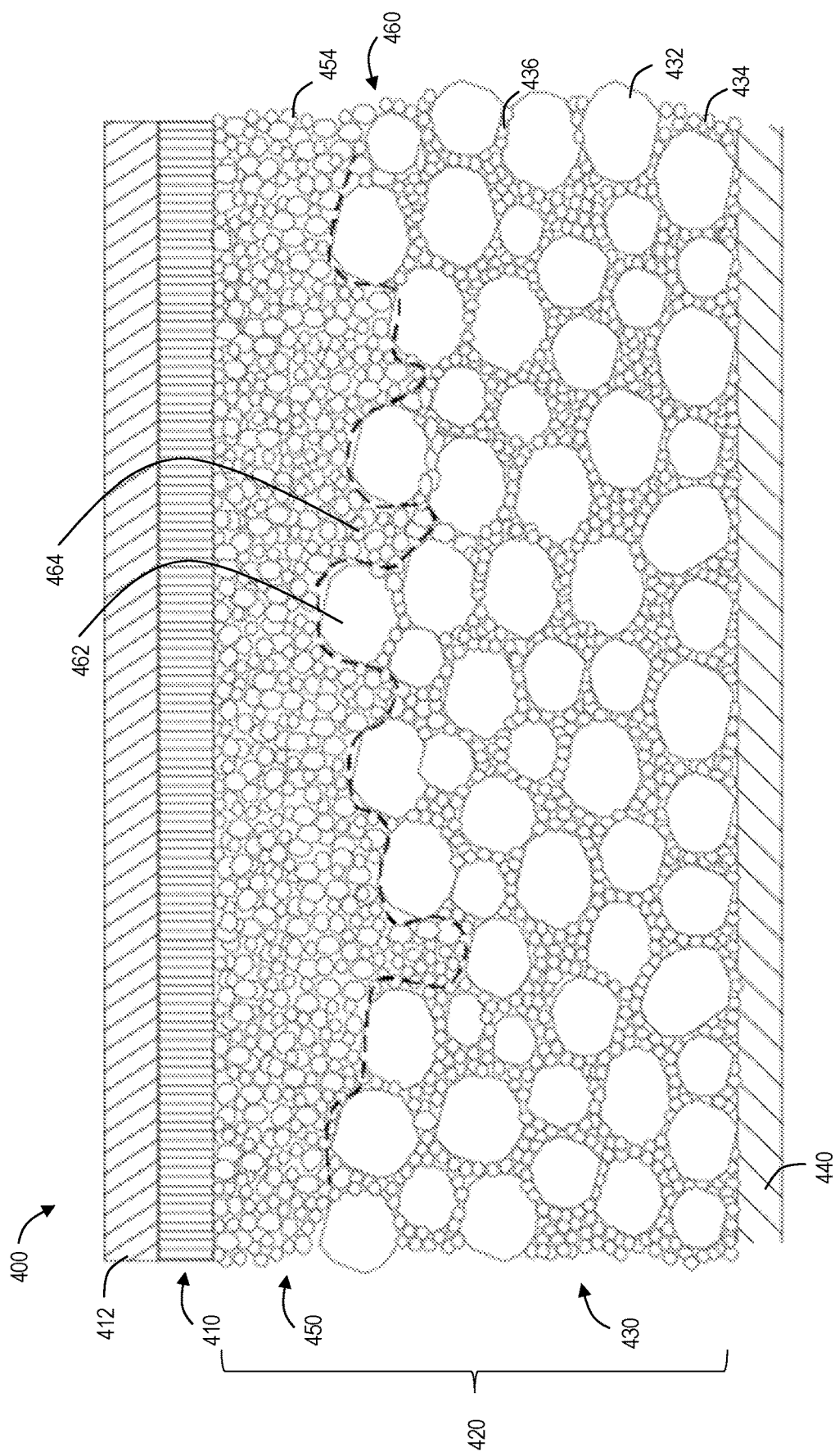
FIG. 5 is a schematic sectional view of an illustrative electrochemical cell having an integrated sulfide separator.

As shown in FIG. 5, this section describes an illustrative solid-state electrochemical cell 400 having an integrated sulfide ceramic separator. Electrochemical cell 400 includes a metallic lithium anode 410 paired with a composite cathode 420 including an integrated sulfide ceramic separator 450. Metallic lithium anode 410 is adjacent to and directly contacting a copper current collector 412. In some examples, metallic lithium anode 410 comprises a metallic lithium foil. In some examples, metallic lithium anode 410 is deposited in-situ onto copper current collector 412. Composite cathode 420 includes an active material composite 430 layered onto an aluminum foil current collector 440. An integrated sulfide separator layer 450 is layered onto and directly contacting active material composite 430. Integrated sulfide separator 450 is disposed between active material composite 430 and metallic lithium anode 410, and insulates the two electrodes from each other.

Composite cathode 420 may be substantially identical to cathode 200, described above. Cathode active material composite 430 includes a plurality of cathode active material particles 432 mixed with a first plurality of sulfide ceramic buffer particles 434. In some examples, active material composite 430 further includes a polymeric binder adhering the active material composite together. Active material composite 430 may be electrically conductive, and may include conductive additives (AKA conductive additive particles) 436 intermixed with active material particles 432 and sulfide ceramic buffer particles 434. The cathode active material particles 432 may comprise any suitable cathode active material, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides and chalcogenides, and/or the like. In some examples, cathode active material particles 432 comprise lithiated transition metal oxides, such as NCA, NMC, LFP, LMO, LNMO, LCO, LTO, NMO, and/or the like. In some examples, an average grain size of the first plurality of sulfide ceramic buffer particles 434 is less than an average particle size of the plurality of cathode active material particles 432.

Cathode 420 includes an integrated sulfide ceramic separator layer 450 layered onto and directly contacting active material composite 430. Integrated separator layer 450 includes a second plurality of sulfide ceramic buffer particles 454. In some examples, sulfide ceramic buffer particles 454 are adhered together by a binder. Integrated separator layer 450 is electrically non-conductive, and is configured to insulate active material composite 430 from anode 410.

The first and second sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in active material composite 430 differ in composition from sulfide ceramic buffer particles included in integrated sulfide ceramic separator layer 450. In some examples, the second plurality of sulfide ceramic buffer particles 454 are configured to have a higher reductive stability with lithium than the first plurality of sulfide ceramic buffer particles. In some examples, the second plurality of sulfide ceramic buffer particles 454 are configured to form stable passivating layers with lithium metal. In some examples, the first plurality of sulfide ceramic buffer particles 434 have higher oxidative stability than the second plurality of sulfide ceramic buffer particles when directly contacting cathode active materials (e.g., cathode active material particles 432). In some examples, the first plurality of sulfide ceramic buffer particles have an average particle size greater than the second plurality of sulfide ceramic buffer particles. In some examples, the second plurality of sulfide ceramic buffer particles have an average particle size greater than the first plurality of sulfide ceramic buffer particles. In some examples, the first and second plurality of sulfide ceramic buffer particles have particle sizes ranging from 50 nm to 50 µm.

In some examples, an interpenetrating boundary region (AKA interlocking region) 460 is disposed between active material composite 430 and integrated separator layer 450. Interpenetrating boundary region 460 may be substantially identical to interpenetrating boundary region 240, as described above (see FIG. 3). Interpenetrating boundary region 460 includes a non-planar boundary between active material composite 430 and integrated separator layer 450. Active material composite 430 and separator layer 450 have respective, three-dimensional, interpenetrating fingers 462 and 464 that interlock the two layers together, forming a mechanically robust interface that is capable of withstanding stresses, such as those due to electrode expansion and contraction, and separator shrinking. Additionally, the non-planar surfaces defined by fingers 462 and fingers 464 represent an increased total surface area of the interface boundary, which may provide reduced interfacial resistance and may increase ion mobility through the electrode. Fingers 462 and 464 may be interchangeably referred to as fingers, protrusions, extensions, projections, and/or the like. Furthermore, the relationship between fingers 462 and 464 may be described as interlocking, interpenetrating, intermeshing, interdigitating, interconnecting, interlinking, and/or the like.

Figure 6:
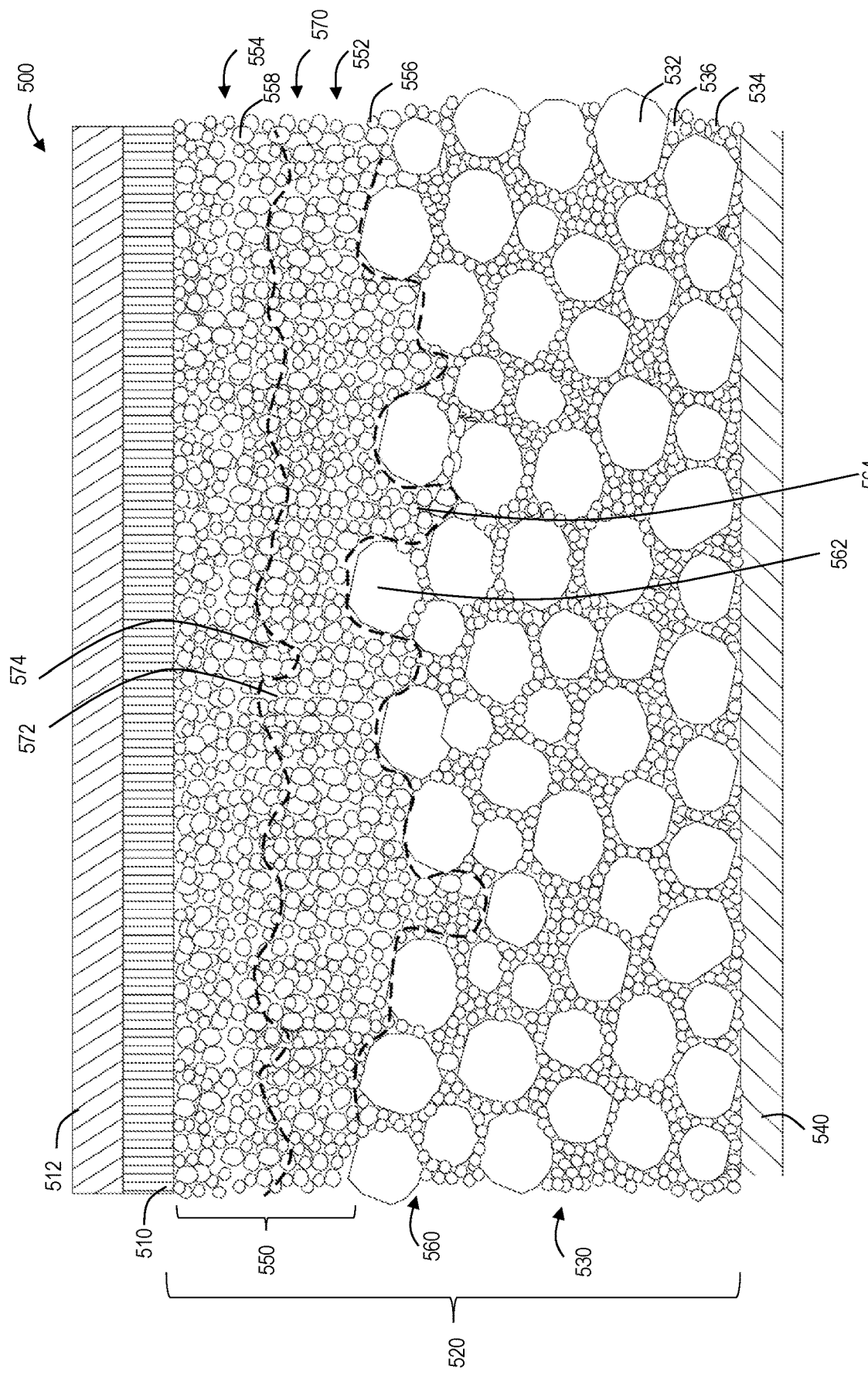
FIG. 6 is a schematic sectional view of an illustrative electrochemical cell having an integrated sulfide separator having two layers of sulfide ceramic materials.

E. Illustrative Electrochemical Cell Having an Integrated Bi-Layered Sulfide Separator As shown in FIG. 6, this section describes an illustrative electrochemical cell 500 having a bi-layered integrated sulfide separator. Electrochemical cell 500 includes a metallic lithium anode 510 paired with a composite cathode 520 including an integrated sulfide ceramic separator 550. Metallic lithium anode 510 is adjacent to and directly contacting a copper current collector 512. In some examples, metallic lithium anode 510 comprises a metallic lithium foil. In some examples, metallic lithium anode 510 is deposited in-situ onto copper current collector 512. Composite cathode 520 includes an active material composite 530 layered onto an aluminum foil current collector 540. A first integrated sulfide separator layer 552 is layered onto and directly contacting active material composite 530. A second integrated sulfide separator layer 554 is layered onto and directly contacting first integrated sulfide separator layer 552. Collectively, first and second integrated sulfide separator layers 554, 552 form integrated sulfide ceramic separator 550. Integrated sulfide separator 550 is disposed between active material composite 530 and metallic lithium anode 510, and insulates the two electrodes from each other.

Composite cathode 520 may be substantially identical to cathode 200, described above. Cathode active material composite 530 includes a plurality of cathode active material particles 532 mixed with a first plurality of sulfide ceramic buffer particles 534. In some examples, active material composite 530 further includes a polymeric binder adhering the active material composite together. Active material composite 530 may be electrically conductive, and may include conductive additives (AKA conductive additive particles) 536 intermixed with active material particles 532 and sulfide ceramic buffer particles 534. The cathode active material particles 532 may comprise any suitable cathode active material, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides and chalcogenides, and/or the like. In some examples, cathode active material particles 532 comprise lithiated transition metal oxides, such as NCA, NMC, LFP, LMO, LNMO, LCO, LTO, NMO, and/or the like. In some examples, an average grain size of the first plurality of sulfide ceramic buffer particles 534 is less than an average particle size of the plurality of cathode active material particles 532.

Cathode 520 includes an integrated sulfide ceramic separator 550 directly contacting active material composite 530. Integrated sulfide ceramic separator layer 550 includes a first integrated sulfide ceramic separator layer 552 comprising a second plurality of sulfide ceramic buffer particles 556 layered onto and directly contacting cathode active material composite 530. Integrated ceramic sulfide separator 550 further includes a second integrated sulfide ceramic separator layer 554 comprising a third plurality of sulfide ceramic buffer particles 558 layered onto and directly contacting first integrated ceramic sulfide separator layer 552. In some examples, sulfide ceramic buffer particles 556 and/or 558 are adhered together by a binder. Integrated separator 550 is electrically non-conductive, and is configured to insulate cathode 520 from anode 510.

The first, second, and third sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in active material composite 530 differ in composition from sulfide ceramic buffer particles included in integrated sulfide ceramic separator 550. In some examples, sulfide ceramic buffer particles included in first integrated sulfide ceramic separator layer 552 differ in composition from sulfide ceramic buffer particles included in second integrated sulfide ceramic separator layer 554. In some examples, sulfide ceramic materials are configured to be stable based on their location within an electrochemical cell. In some examples, the third plurality of sulfide ceramic buffer particles 558 are configured to have a higher reductive stability with lithium than the first and/or second plurality of sulfide ceramic buffer particles. In some examples, the third plurality of sulfide ceramic buffer particles 558 are configured to form stable passivating layers with lithium metal. In some examples, the first plurality of sulfide ceramic buffer particles 534 have higher oxidative stability than the second plurality of sulfide ceramic buffer particles when directly contacting cathode active materials (e.g., cathode active material particles 532). In some examples, the first plurality of sulfide ceramic buffer particles have an average particle size greater than the second plurality of sulfide ceramic buffer particles. In some examples, the second plurality of sulfide ceramic buffer particles have an average particle size greater than the first plurality of sulfide ceramic buffer particles. In some examples, the first and second plurality of sulfide ceramic buffer particles have particle sizes ranging from 50 nm to 50 µm.

In some examples, an interpenetrating boundary region (AKA interlocking region) 560 is disposed between cathode active material composite 530 and first integrated separator layer 552. Interpenetrating boundary region 560 may be substantially identical to interpenetrating boundary region 240, as described above (see FIG. 3). Interpenetrating boundary region 560 includes a non-planar boundary between cathode active material composite 530 and first integrated separator layer 552. Cathode active material composite 530 and first integrated separator layer 552 have respective, three-dimensional, interpenetrating fingers 562 and 564 that interlock the two layers together, forming a mechanically robust interface that is capable of withstanding stresses, such as those due to electrode expansion and contraction, and separator shrinking.

Similarly, in some examples, an interpenetrating boundary region (AKA interlocking region) 570 is disposed between first integrated separator layer 552 and second integrated separator layer 554. Interpenetrating boundary region 570 may be substantially identical to interpenetrating boundary region 240, as described above (see FIG. 3). Interpenetrating boundary region 570 includes a non-planar boundary between first integrated separator layer 552 and second integrated separator layer 554. First integrated separator layer 552 and second integrated separator layer 554 have respective, three-dimensional, interpenetrating fingers 572 and 574 that interlock the two layers together, forming a mechanically robust interface that is capable of withstanding stresses, such as those due to electrode expansion and contraction, and separator shrinking.

F. Illustrative Electrochemical Cell Having Two Integrated Sulfide Separators

Figure 7:
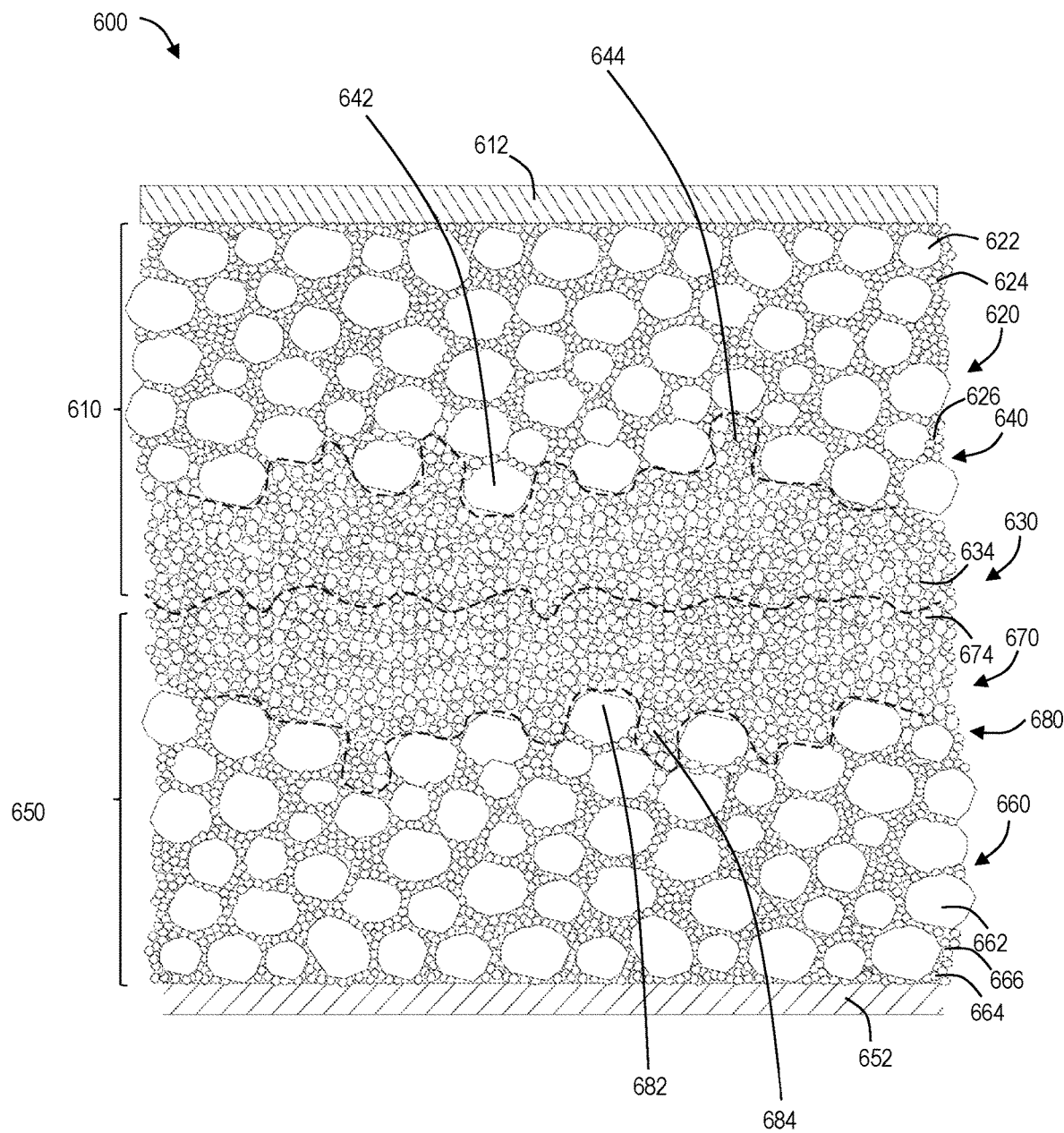
FIG. 7 is a schematic sectional view of an illustrative electrochemical cell including a cathode having an integrated sulfide separator and an anode having an integrated sulfide separator.

As shown in FIG. 7, this section describes an illustrative electrochemical cell 600 having a composite anode 610 having a first integrated sulfide separator 630 and a composite cathode 650 having a second integrated sulfide separator 670. Composite anode 610 is substantially similar to composite anode 300, described above. Composite cathode 650 is substantially similar to composite cathode 200, described above.

First integrated sulfide separator 630 is adhered to composite anode 610, and second integrated sulfide separator 670 is adhered to composite cathode 650. Composite anode 610 and composite cathode 650 are oriented such that first integrated sulfide separator 630 and second integrated sulfide separator 670 are directly contacting and collectively form a combined cell separator, which insulates the electrodes from each other.

Composite anode 610 includes an anode active material composite 620 layered onto a copper foil current collector 612. A first integrated sulfide separator layer 630 is layered onto and directly contacting active material composite 620. Anode active material composite 620 includes a plurality of anode active material particles 622 mixed with a first plurality of sulfide ceramic buffer particles 624. In some examples, anode active material composite 620 further includes a polymeric binder adhering the active material composite together. Active material composite 620 may be electrically conductive, and may include conductive additives (AKA conductive additive particles) 626 intermixed with anode active material particles 622 and sulfide ceramic buffer particles 624. The anode active material particles 622 may comprise any suitable anode active material, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In some examples, the anode active material particles 622 comprise silicon and/or graphite. In some examples, an average grain size of the first plurality of sulfide ceramic buffer particles 624 is less than an average particle size of the plurality of anode active material particles 622.

Anode 610 includes a first integrated sulfide ceramic separator layer 630 layered onto and directly contacting anode active material composite 620. First integrated separator layer 630 includes a second plurality of sulfide ceramic buffer particles 634. In some examples, sulfide ceramic buffer particles 634 are adhered together by a binder. First integrated separator layer 630 is electrically non-conductive, and is configured to insulate active material composite 620 from cathode 650.

The first and second sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}$ $Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in anode active material composite 620 differ in composition from sulfide ceramic buffer particles included in integrated sulfide ceramic separator layer 630. In some examples, the first plurality of sulfide ceramic buffer particles have an average particle size greater than the second plurality of sulfide ceramic buffer particles. In some examples, the second plurality of sulfide ceramic buffer particles have an average particle size greater than the first plurality of sulfide ceramic buffer particles. In some examples, the first and second plurality of sulfide ceramic buffer particles have particle sizes ranging from 50 nm to 50 μm.

In some examples, an interpenetrating boundary region (AKA interlocking region) 640 is disposed between anode active material composite 620 and first integrated separator layer 630. Interpenetrating boundary region 640 may be substantially identical to interpenetrating boundary region 240 (see FIG. 3). Interpenetrating boundary region 640 includes a non-planar boundary between active material composite 620 and integrated separator layer 630. Active material composite 620 and separator layer 630 have respective, three-dimensional, interpenetrating fingers 642 and 644 that interlock the two layers together, forming a mechanically robust interface that is capable of withstanding stresses, such as those due to electrode expansion and contraction, and separator shrinking.

Composite cathode 650 includes a cathode active material composite 660 layered onto an aluminum foil current collector 652. An second integrated sulfide separator layer 670 is layered onto and directly contacting cathode active material composite 660. Cathode active material composite 660 includes a plurality of cathode active material particles 662 mixed with a third plurality of sulfide ceramic buffer particles 664. In some examples, cathode active material composite 660 further includes a polymeric binder adhering the active material composite together. Cathode active material composite 660 may be electrically conductive, and may include conductive additives (AKA conductive additive particles) 666 intermixed with active material particles 662 and sulfide ceramic buffer particles 664. The cathode active material particles 662 may comprise any suitable cathode active material, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides and chalcogenides, and/or the like. In some examples, cathode active material particles 662 comprise lithiated transition metal oxides, such as NCA, NMC, LFP, LMO, LNMO, LCO, LTO, NMO, and/or the like. In some examples, an average grain size of the third plurality of sulfide ceramic buffer particles 664 is less than an average particle size of the plurality of cathode active material particles 662.

Composite cathode 650 includes second integrated sulfide ceramic separator layer 670 layered onto and directly contacting cathode active material composite 660. Second integrated separator layer 670 includes a fourth plurality of sulfide ceramic buffer particles 674. In some examples, sulfide ceramic buffer particles 674 are adhered together by a binder. Second integrated separator layer 670 is electrically non-conductive, and is configured to insulate cathode active material composite 660 from anode 610.

The third and fourth sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}$ $Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in cathode active material composite 660 differ in composition from sulfide ceramic buffer particles included in second integrated sulfide ceramic separator layer 670. In some examples, the third plurality of sulfide ceramic buffer particles 664 have higher oxidative stability than the fourth plurality of sulfide ceramic buffer particles when directly contacting cathode active materials (e.g., cathode active material particles 662). In some examples, the third plurality of sulfide ceramic buffer particles have an average particle size greater than the fourth plurality of sulfide ceramic buffer particles. In some examples, the fourth plurality of sulfide ceramic buffer particles have an average particle size greater than the third plurality of sulfide ceramic buffer particles. In some examples, the third and fourth plurality of sulfide ceramic buffer particles have particle sizes ranging from 50 nm to 50 μm.

In some examples, an interpenetrating boundary region (AKA interlocking region) 680 is disposed between cathode active material composite 660 and second integrated separator layer 670. Interpenetrating boundary region 680 may be substantially identical to interpenetrating boundary region 240 (see FIG. 3). Interpenetrating boundary region 680 includes a non-planar boundary between cathode active material composite 660 and second integrated separator layer 670. Cathode active material composite 660 and second separator layer 670 have respective, three-dimensional, interpenetrating fingers 682 and 684 that interlock the two layers together, forming a mechanically robust interface that is capable of withstanding stresses, such as those due to electrode expansion and contraction, and separator shrinking. Additionally, the non-planar surfaces defined by fingers 682 and fingers 684 represent an increased total surface area of the interface boundary, which may provide reduced interfacial resistance and may increase ion mobility through the electrode. Fingers 682 and 684 may be interchangeably referred to as fingers, protrusions, extensions, projections, and/or the like. Furthermore, the relationship between fingers 682 and 684 may be described as interlocking, interpenetrating, intermeshing, interdigitating, interconnecting, interlinking, and/or the like.

An interface between first integrated separator layer 630 and second integrated separator layer 670 may comprise a non-planar boundary region, which may include interpenetrations, interdigitations, and/or the like. In some examples, first integrated separator layer 630 and second integrated separator layer 670 may be calendered, and an interface between the first and second integrated boundary layers may comprise a planar interface. In some examples, first integrated separator layer 630 and second integrated separator 670 may remain uncalendered until assembly of the electrochemical cell, and the electrochemical cell may be calendered together.

G. Illustrative Electrochemical Cell Having Dually-Integrated Sulfide Separator

Figure 8:
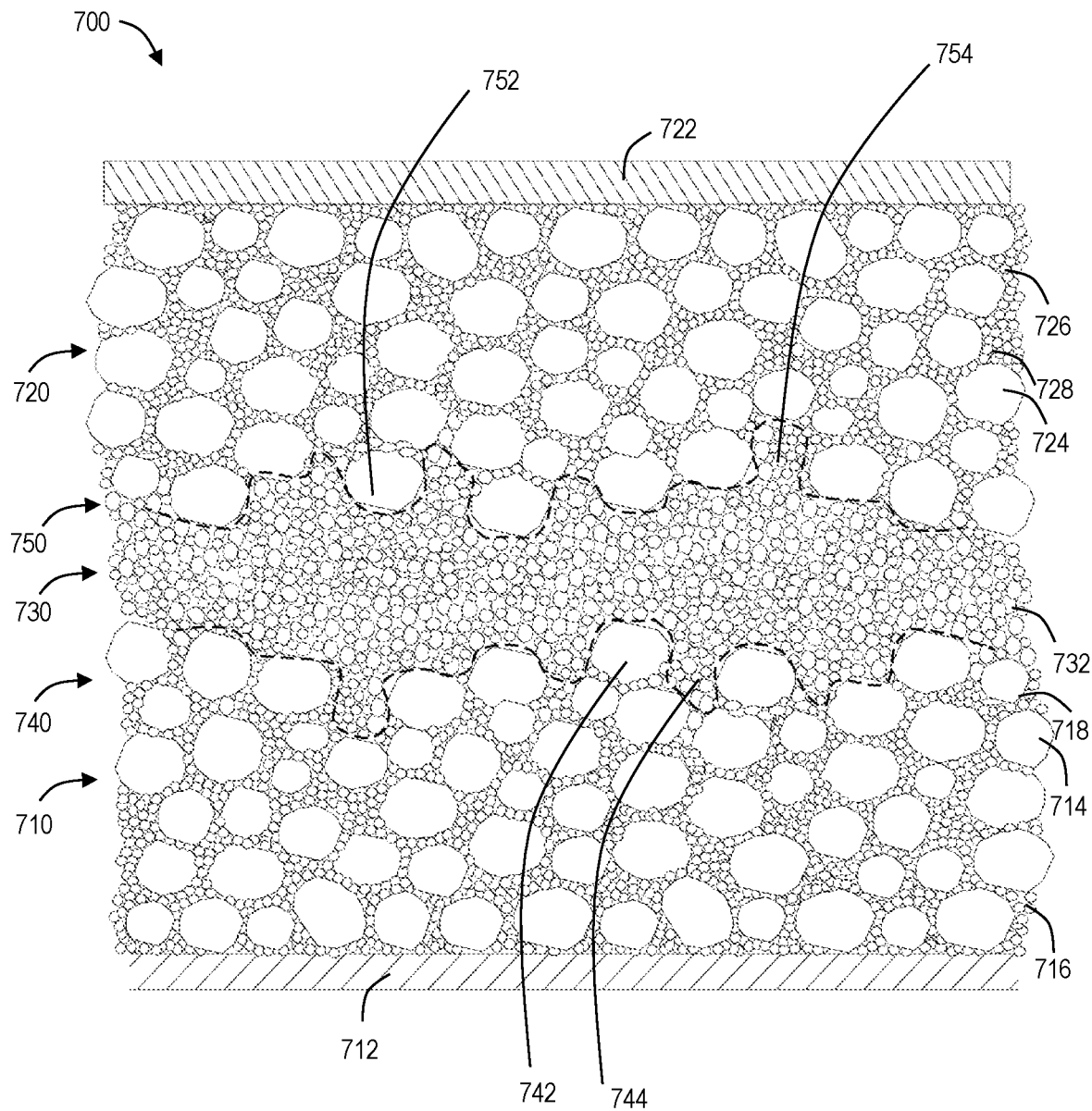
FIG. 8 is a schematic sectional view of an illustrative electrochemical cell having a simultaneously coated integrated sulfide separator, which is integrated with both an anode and a cathode.

As shown in FIG. 8, this section describes an illustrative electrochemical cell 700 having a bi-layered integrated sulfide separator. Illustrative electrochemical cell 700 includes a cathode 710, an anode 720, and an integrated sulfide ceramic separator 730 disposed between and adhered to the anode and the cathode.

In some examples, a composite cathode layer 710 is layered onto and directly contacting an aluminum foil current collector 712. Composite cathode layer 710 comprises a plurality of cathode active material particles 714 mixed with a first plurality of sulfide ceramic buffer particles 716. In some examples, composite cathode layer 710 further includes a polymeric binder adhering the active material composite together. Composite cathode layer 710 may be electrically conductive, and may include conductive additives (AKA conductive additive particles) 718 intermixed with active material particles 714 and sulfide ceramic buffer particles 716. The cathode active material particles 714 may comprise any suitable cathode active material, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides and chalcogenides, and/or the like. In some examples, cathode active material particles 714 comprise lithiated transition metal oxides, such as NCA, NMC, LFP, LMO, LNMO, LCO, LTO, NMO, and/or the like. In some examples, an average grain size of the first plurality of sulfide ceramic buffer particles 716 is less than an average particle size of the plurality of cathode active material particles 714.

An integrated sulfide ceramic separator 730 is layered onto and directly contacting composite cathode layer 710. Integrated sulfide ceramic separator 730 includes a second plurality of sulfide ceramic buffer particles 732. In some examples, sulfide ceramic buffer particles 732 are adhered together by a binder. Integrated sulfide ceramic separator 730 is electrically non-conductive, and is configured to insulate cathode 710 from anode 720.

A composite anode layer 720 is layered onto and directly contacting integrated sulfide ceramic separator 730. Composite anode layer 720 comprises a plurality of anode active material particles 724 mixed with a third plurality of sulfide ceramic buffer particles 726. In some examples, composite anode layer 720 further includes a polymeric binder adhering the active material composite together. Composite anode layer 720 may be electrically conductive, and may include conductive additives (AKA conductive additive particles) 728 intermixed with active material particles 724 and sulfide ceramic buffer particles 726. The anode active material particles 724 may comprise any suitable anode active material, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In some examples, the anode active material particles 724 comprise silicon and/or graphite. In some examples, an average grain size of the third plurality of sulfide ceramic buffer particles 726 is less than an average particle size of the plurality of anode active material particles 724. A copper current collector 722 may be laminated onto an external surface of anode 720.

The first, second, and third sulfide ceramic buffer particles may comprise any suitable sulfide ceramic, such as $Li_2CaAl_2S_4$, $LiAlS_2$, $Li_7P_3S_{11}$, $Li_{10}GeP_2S_{12}$, $Li_{10}SiP_2S_{12}$, $Li_{1.07}Al_{0.69}Ti_{1.46}(PO_4)_3$, $Li_{1.5}Al_{0.5}Ge_{1.5}(PO_4)_3$, $Li_{3.25}P_{0.95}S_4$, and/or the like. In some examples, sulfide ceramic buffer particles included in composite anode layer 720, composite cathode layer 710, and integrated sulfide separator layer 730 differ in composition. In some examples, the first, second, and third sulfide ceramic buffer particles differ in average particle size. In some examples, the first, second, and third plurality of sulfide ceramic buffer particles have particle sizes ranging from 50 nm to 50 μm.

In some examples, a first interpenetrating boundary region (AKA interlocking region) 740 is disposed between composite cathode 710 and integrated separator layer 730. Interpenetrating boundary region 740 may be substantially identical to interpenetrating boundary region 240 (see FIG. 3). Interpenetrating boundary region 740 includes a non-planar boundary between composite cathode 710 and integrated separator layer 730. Composite cathode 710 and integrated separator layer 730 have respective, three-dimensional, interpenetrating fingers 742 and 744 that interlock the two layers together, forming a mechanically robust interface that is capable of withstanding stresses, such as those due to electrode expansion and contraction, and separator shrinking. Additionally, the non-planar surfaces defined by fingers 742 and fingers 744 represent an increased total surface area of the interface boundary, which may provide reduced interfacial resistance and may increase ion mobility through the electrode. Fingers 742 and 744 may be interchangeably referred to as fingers, protrusions, extensions, projections, and/or the like. Furthermore, the relationship between fingers 742 and 744 may be described as interlocking, interpenetrating, intermeshing, interdigitating, interconnecting, interlinking, and/or the like.

In some examples, a second interpenetrating boundary region (AKA interlocking region) 750 is disposed between composite anode 720 and integrated separator layer 730. Interpenetrating boundary region 750 may be substantially identical to interpenetrating boundary region 240 (see FIG. 3). Interpenetrating boundary region 750 includes a non-planar boundary between composite anode 720 and integrated separator layer 730. Composite anode 720 and separator layer 730 have respective, three-dimensional, interpenetrating fingers 752 and 754 that interlock the two layers together, forming a mechanically robust interface that is capable of withstanding stresses, such as those due to electrode expansion and contraction, and separator shrinking.

In the example described above, electrochemical cell layers are deposited onto an aluminum foil current collector in the order: cathode, separator, anode. However, the structure depicted in FIG. 8 may also depict electrochemical cell layers deposited onto a copper current collector in the order: anode, separator, cathode. The resulting electrochemical cell has a substantially identical structure to the structure described above, but a different orientation.

H. Illustrative Method of Manufacturing Electrode Having Integrated Sulfide Separator The following describes steps of an illustrative method 800 for forming an electrode having an integrated sulfide separator; see FIGS. 9-10.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 9:
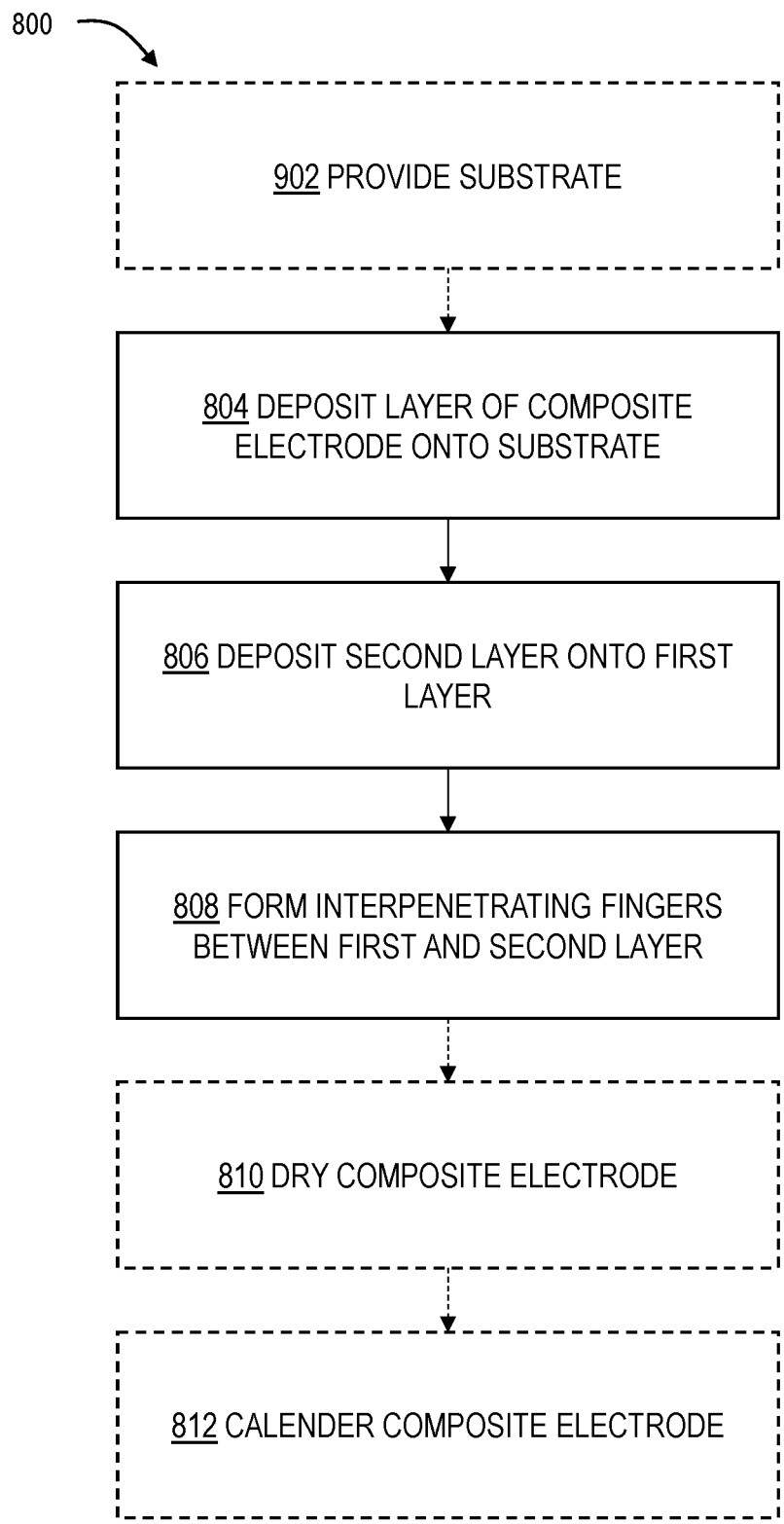
FIG. 9 is a flow chart depicting steps of an illustrative method for manufacturing an electrode having an integrated sulfide separator.

FIG. 9 is a flowchart illustrating steps performed in an illustrative method, and may not recite the complete process or all steps of the method. Although various steps of method 800 are described below and depicted in FIG. 9, the steps need not necessarily all be performed, and in some cases may be performed simultaneously, or in a different order than the order shown.

Step 802 of method 800 includes optionally providing a substrate, wherein the substrate includes any suitable structure and material configured to function as a conductor in a secondary battery of the type described herein. In some examples, the substrate comprises a current collector. In some examples, the substrate comprises a metal foil. In examples wherein the electrode is a cathode, the substrate may comprise an aluminum foil. In examples wherein the electrode is an anode, the substrate may comprise a copper foil. The term "providing" here may include receiving, obtaining, purchasing, manufacturing, generating, processing, preprocessing, and/or the like, such that the substrate is in a state and configuration for the following steps to be carried out.

Method 800 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of sulfide ceramic material particles.

Step 804 of method 800 includes coating a first layer of a composite electrode on a first side of the substrate. In some examples, the first layer may include a plurality of first active material particles and a plurality of first solid electrolyte buffer particles adhered together by a first binder, the first particles having a first average particle size (or other first particle distribution). In some examples, the first solid electrolyte buffer particles comprise a sulfide ceramic material. In some examples, the first layer is conductive. In some examples, the first layer includes conductive additives (AKA a plurality of conductive additive particles) intermixed with the plurality of first active material particles. In some examples, the composite electrode is a cathode suitable for inclusion within a solid-state electrochemical cell. In this case, the first active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides. In some examples, the cathode active material particles may comprise lithiated transition metal oxides. In some examples, the composite electrode is an anode suitable for inclusion within a solid-state electrochemical cell. In this case, the first active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the first active material particles comprise graphite and/or silicon.

The coating process of step 804 may include any suitable coating method(s), such as slot die, blade coating, spray-based coating, electrostatic jet coating, or the like. In some examples, the first layer is coated as a wet slurry of anhydrous organic solvent, (e.g., cyclohexane, chlorobenzene, acetonitrile, toluene), binder, conductive additive, active material, and solid electrolyte buffer materials. In some examples, the first layer is coated dry, as an active material with a binder and/or a conductive additive. Step 804 may optionally include drying the first layer of the composite electrode.

Step 806 of method 800 includes coating a second layer onto the first layer, forming a multilayered (e.g., stratified) structure. The second layer may include a plurality of second particles adhered together by a second binder, the second particles having a second average particle size (or other second particle distribution). In this example, the second layer comprises a plurality of second solid electrolyte buffer particles configured to function as a separator. For example, the second layer may comprise a solid electrolyte buffer material, such as a sulfide ceramic material and/or the like. In some examples, the second layer is non-conductive.

Step 808 of method 800 includes forming interpenetrating finger structures between the first and second layers. In some examples, steps 804 and 806 may be performed substantially simultaneously. For example, both of the slurries may be extruded through their respective orifices simultaneously. This forms a two-layer slurry bead and coating on the moving substrate. In some examples, difference in viscosities, difference in surface tensions, difference in densities, difference in solids contents, and/or different solvents used between the first active material slurry and the second separator slurry may be tailored to cause interpenetrating finger structures at the boundary between the two composite layers. In some embodiments, the viscosities, surface tensions, densities, solids contents, and/or solvents may be substantially similar. Creation of interpenetrating structures, if desired, may be facilitated by turbulent flow at the wet interface between the first active material slurry and the second separator slurry, creating partial intermixing of the two slurries. In some examples, the interpenetrating finger structures may have a length of at least 2 µm or at least twice the diameter of an average particle size of the first or second solid electrolyte buffer particles.

In some examples, any of the described steps may be repeated to form three or more layers. For example, an additional layer or layers may include active materials to form a multilayered electrode structure before adding the separator layer. Any method described herein to impart structure between the first active material layer and the separator coating may be utilized to form similar structures between any additional layers deposited during the manufacturing process.

Method 800 may optionally include drying the composite electrode in step 810. Both the first and second layers may experience the drying process as a combined structure. In some examples, drying step 808 includes a form of heating and energy transport to and from the electrode (e.g., convection, conduction, radiation) to expedite the drying process. Drying the composite electrode includes evaporating the solvent of both the first and the second layers.

Method 800 may optionally include calendering and/or hot compressing (e.g., in a hot roll process) the composite electrode in step 812. Both the first and second layers may experience the calendering process as a combined structure. In some examples, calendering is replaced with another compression, pressing, or compaction process. In some examples, calendering the electrode may be performed by pressing the combined first and second layers against the substrate. In some examples, the composite electrode may be calendered at temperatures of no greater than 600° C. due to lower sintering temperatures of sulfide ceramic materials. In some examples, calendaring the composite electrode may sinter the solid electrolyte buffer particles, creating a dense, low-impedance system with low or zero porosity.

Figure 10:
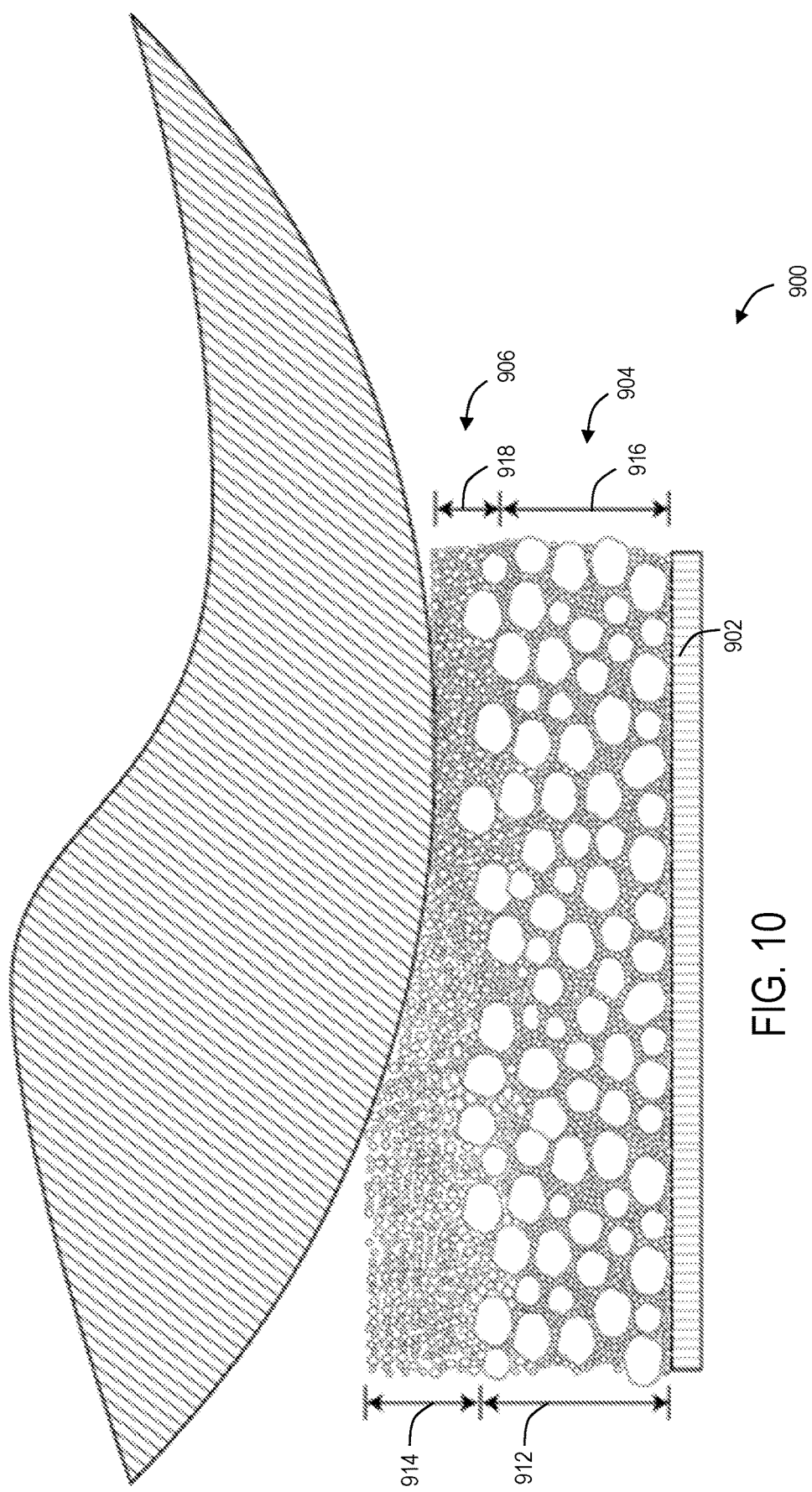
FIG. 10 is a sectional view of an illustrative electrode undergoing a calendering process in accordance with aspects of the present disclosure.

FIG. 10 shows an electrode undergoing the calendering process, in which particles in a second layer 906 (AKA the separator layer) can be calendered with a first layer 904

(AKA the active material layer). This may prevent a "crust" formation on the electrode, specifically on the active material layer. A roller 910 may apply pressure to a fully assembled electrode 900. Electrode 900 may include first layer 904 and second layer 906 applied to a substrate web 902. First layer 904 may have a first uncompressed thickness 912 and second layer 906 may have a second uncompressed thickness 914 prior to calendering. After the electrode has been calendered, first layer 904 may have a first compressed thickness 916 and second layer 906 may have a second compressed thickness 918. Calendering the electrode may sinter sulfide particles included in the first and second layer, creating a fully dense, low-impedance system with low or zero porosity.

I. Illustrative Method of Manufacturing Electrode Having Integrated Bi-Layered Sulfide Separator This section describes steps of an illustrative method 1000 for manufacturing an electrode having an integrated bi-layered sulfide separator; see FIG. 11. Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 11:
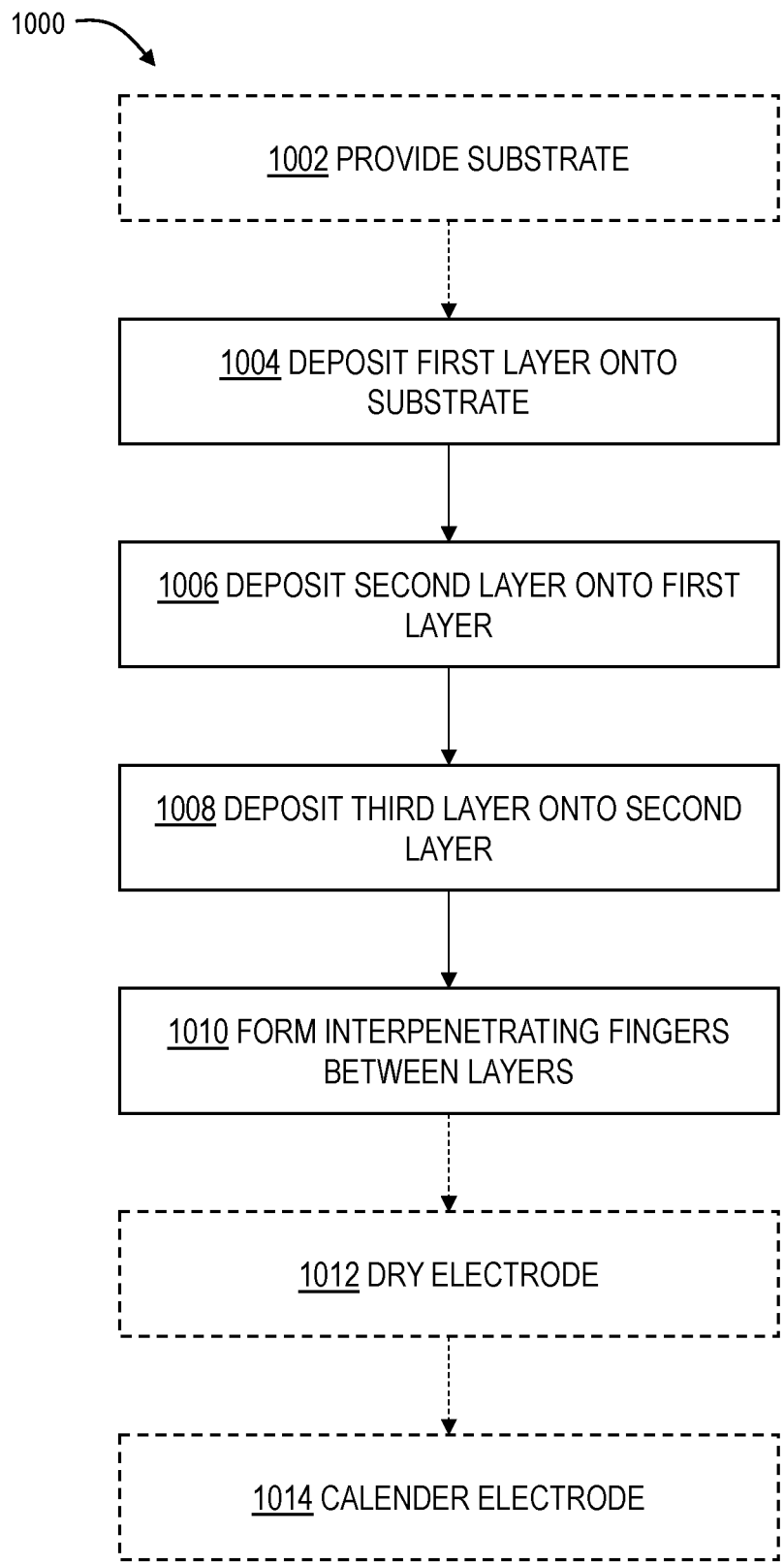
FIG. 11 is a flow chart depicting steps of an illustrative method for manufacturing an electrode having a bi-layered integrated sulfide separator.

FIG. 11 is a flowchart illustrating steps performed in an illustrative method, and may not recite the complete process or all steps of the method. Although various steps of method 1000 are described below and depicted in FIG. 11, the steps need not necessarily all be performed, and in some cases may be performed simultaneously or in a different order than the order shown.

Step 1002 of method 1000 includes optionally providing a substrate, wherein the substrate includes any suitable structure and material configured to function as a conductor in a secondary battery of the type described herein. In some examples, the substrate comprises a current collector. In some examples, the substrate comprises a metal foil. In examples wherein the electrode is a cathode, the substrate may comprise an aluminum foil. In examples wherein the electrode is an anode, the substrate may comprise a copper foil. The term "providing" here may include receiving, obtaining, purchasing, manufacturing, generating, processing, preprocessing, and/or the like, such that the substrate is in a state and configuration for the following steps to be carried out.

Method 1000 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of sulfide ceramic material particles.

Step 1004 of method 1000 includes coating a first layer of a composite electrode on a first side of the substrate. In some examples, the first layer may include a plurality of first active material particles and a plurality of first solid electrolyte buffer particles adhered together by a first binder, the first particles having a first average particle size (or other first particle distribution). In some examples, the first solid electrolyte buffer particles comprise a sulfide ceramic material. In some examples, the first layer is conductive. In some examples, the first layer includes conductive additives (AKA a plurality of conductive additive particles) intermixed with the plurality of first active material particles. In some examples, the composite electrode is a cathode suitable for inclusion within a solid-state electrochemical cell. In this case, the first active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides. In some examples, the cathode active material particles may comprise lithiated transition metal oxides. In some examples, the composite electrode is an anode suitable for inclusion within a solid-state electrochemical cell. In this case, the first active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the first active material particles comprise graphite and/or silicon.

The coating process of step 1004 may include any suitable coating method(s), such as slot die, blade coating, spray-based coating, electrostatic jet coating, or the like. In some examples, the first layer is coated as a wet slurry of anhydrous organic solvent, (e.g., cyclohexane, chlorobenzene, acetonitrile, toluene), binder, conductive additive, active material, and solid electrolyte buffer materials. In some examples, the first layer is coated dry, as an active material with a binder and/or a conductive additive. Step 1004 may optionally include drying the first layer of the composite electrode.

Step 1006 of method 1000 includes coating a second layer onto the first layer, forming a multilayered (e.g., stratified) structure. The second layer may include a plurality of second particles adhered together by a second binder, the second particles having a second average particle size (or other second particle distribution). In this example, the second layer comprises a plurality of second solid electrolyte buffer particles configured to function as a separator. For example, the second layer may comprise a solid electrolyte buffer material, such as a sulfide ceramic material and/or the like. In some examples, the second layer is non-conductive.

Step 1008 of method 1000 includes coating a third layer onto the second layer. The third layer may include a plurality of third particles adhered together by a third binder, the third particles having a third average particle size (or other second particle distribution). In this example, the third layer comprises a plurality of third solid electrolyte buffer particles configured to function as a separator. For example, the third layer may comprise a solid electrolyte buffer material, such as a sulfide ceramic material and/or the like. The second solid electrolyte buffer material and the third solid electrolyte buffer material may be selected to improve electrochemical stability in various regions of the cell, where the sulfide ceramic materials are tuned to be stable for their location in the cell. In some examples, the third layer is non-conductive.

Step 1010 of method 1000 includes forming interpenetrating finger structures between the electrode layers. In some examples, steps 1004, 1006, and 1008 may be performed substantially simultaneously. For example, the slurries may be extruded through their respective orifices simultaneously. This forms a three-layer slurry bead and coating on the moving substrate. In some examples, difference in viscosities, difference in surface tensions, difference in densities, difference in solids contents, and/or different solvents used between the adjacent active material slurries may be tailored to cause interpenetrating finger structures at the boundary between the first and second layer, and between the second and third layer. In some embodiments, the viscosities, surface tensions, densities, solids contents, and/or solvents may be substantially similar. Creation of interpenetrating structures, if desired, may be facilitated by turbulent flow at the wet interface between the first active material slurry and the second separator slurry, and between the second separator slurry and the third separator slurry, creating partial intermixing of the adjacent slurries. In some examples, the interpenetrating finger structures may have a length of at least 2 μm or at least twice the diameter of an average particle size of the first, second, or third solid electrolyte buffer particles.

Method 1000 may optionally include drying the composite electrode in step 1012. The first, second, and third layers may experience the drying process as a combined structure. In some examples, drying step 1012 includes a form of heating and energy transport to and from the electrode (e.g., convection, conduction, radiation) to expedite the drying process. Drying the composite electrode includes evaporating the solvent of the first, second, and third layers.

Method 1000 may optionally include calendering and/or hot compressing (e.g., in a hot roll process) the composite electrode in step 1014. The first, second, and third layers may experience the calendering process as a combined structure. In some examples, calendering is replaced with another compression, pressing, or compaction process. In some examples, calendering the electrode may be performed by pressing the combined layers against the substrate. In some examples, the composite electrode may be calendered at temperatures of no greater than 600° C. due to lower sintering temperatures of sulfide ceramic materials. In some examples, calendaring the composite electrode may sinter the solid electrolyte buffer particles, creating a dense, low-impedance system with low or zero porosity.

J. Illustrative Method of Manufacturing Electrochemical Cell Having Integrated Sulfide Separator This section describes steps of an illustrative method 1100 for manufacturing an electrochemical cell having an integrated sulfide separator; see FIG. 12. Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 12:
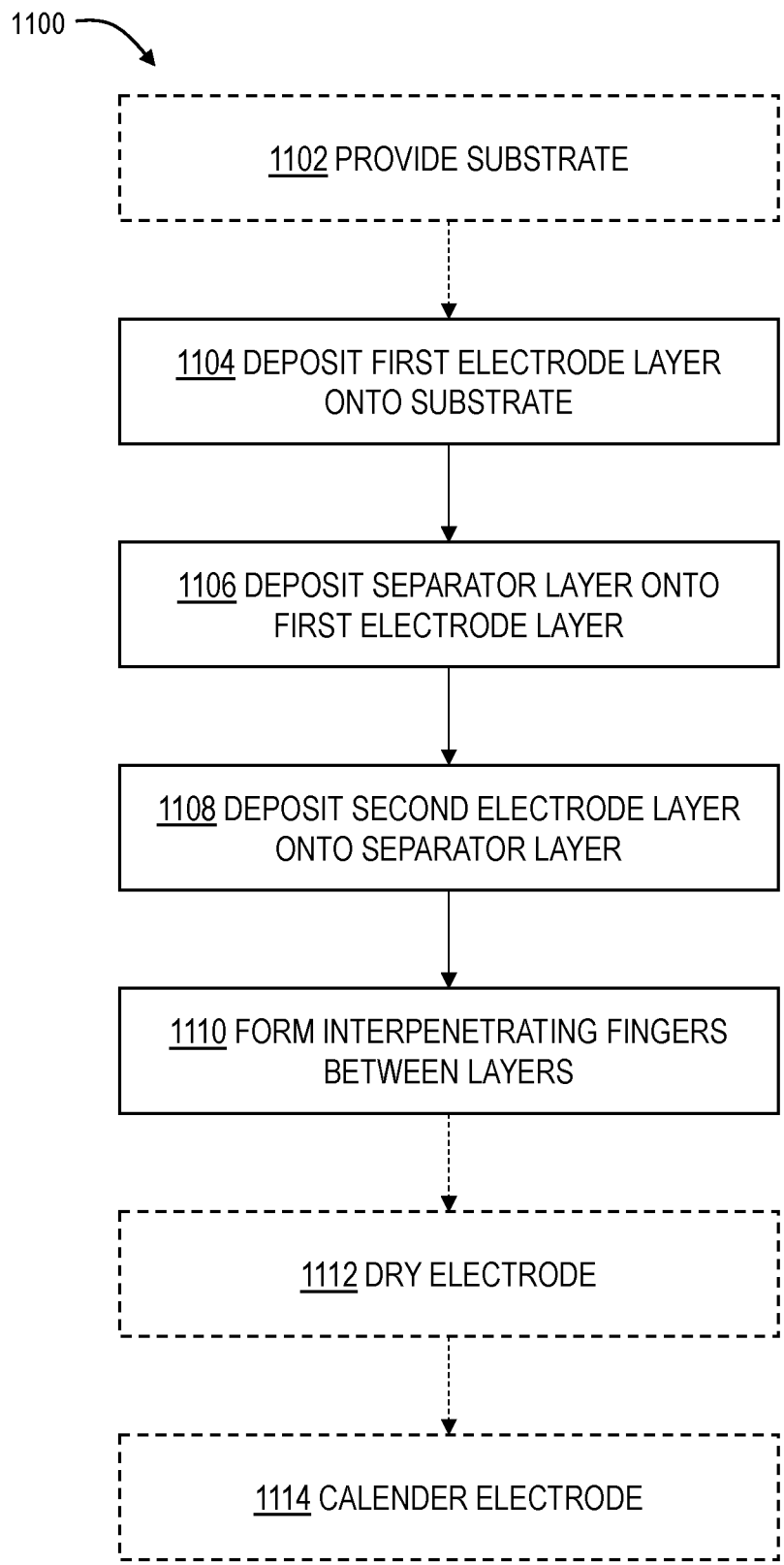
FIG. 12 is a flow chart depicting steps of an illustrative method for manufacturing an electrochemical cell including a simultaneously coated integrated sulfide separator, which is integrated with both an anode and a cathode.

FIG. 12 is a flowchart illustrating steps performed in an illustrative method, and may not recite the complete process or all steps of the method. Although various steps of method 1100 are described below and depicted in FIG. 12, the steps need not necessarily all be performed, and in some cases may be performed simultaneously or in a different order than the order shown.

Step 1102 of method 1100 includes optionally providing a substrate, wherein the substrate includes any suitable structure and material configured to function as a conductor in a secondary battery of the type described herein. In some examples, the substrate comprises a current collector. In some examples, the substrate comprises a metal foil. In examples wherein the first electrode layer is a cathode, the substrate may comprise an aluminum foil. In examples wherein the first electrode layer is an anode, the substrate may comprise a copper foil. The term "providing" here may include receiving, obtaining, purchasing, manufacturing, generating, processing, preprocessing, and/or the like, such that the substrate is in a state and configuration for the following steps to be carried out.

Method 1100 next includes a plurality of steps in which at least a portion of the substrate is coated with an electrochemical cell material composite. This may be done by causing a current collector substrate and a cell material composite dispenser to move relative to each other, by causing the substrate to move past a cell material composite dispenser (or vice versa) that coats the substrate as described below. The composition of material particles in each cell material composite layer may be selected to achieve the benefits, characteristics, and results described herein. The cell material composite may include one or more electrode layers, including a plurality of active material particles, and one or more separator layers, each including a plurality of sulfide ceramic material particles.

Step 1104 of method 1100 includes coating a first electrode layer of a composite electrochemical cell on a first side of the substrate. In some examples, the first electrode layer may include a plurality of first active material particles and a plurality of first solid electrolyte buffer particles adhered together by a first binder, the first particles having a first average particle size (or other first particle distribution). In some examples, the first solid electrolyte buffer particles comprise a sulfide ceramic material. In some examples, the first electrode layer is conductive. In some examples, the first layer includes conductive additives (AKA a plurality of conductive additive particles) intermixed with the plurality of active material particles. In some examples, the first electrode layer is a cathode. In this case, the first active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides. In some examples, the cathode active material particles may comprise lithiated transition metal oxides. In some examples, the first electrode layer is an anode. In this case, the first active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the first active material particles comprise graphite and/or silicon.

The coating process of step 1104 may include any suitable coating method(s), such as slot die, blade coating, spray-based coating, electrostatic jet coating, or the like. In some examples, the first layer is coated as a wet slurry of anhydrous organic solvent, (e.g., cyclohexane, chlorobenzene, acetonitrile, toluene), binder, conductive additive, active material, and solid electrolyte buffer materials. In some examples, the first layer is coated dry, as an active material with a binder and/or a conductive additive. Step 1104 may optionally include drying the first layer of the composite electrochemical cell.

Step 1106 of method 1100 includes coating a separator layer onto the first electrode layer, forming a multilayered (e.g., stratified) structure. The separator layer may include a plurality of second particles adhered together by a second binder, the second particles having a second average particle size (or other second particle distribution). In this example, the separator layer comprises a plurality of second solid electrolyte buffer particles configured to function as a separator. For example, the separator layer may comprise a solid electrolyte buffer material, such as a sulfide ceramic material and/or the like. In some examples, the separator layer is non-conductive.

Step 1108 of method 1100 includes coating a second electrode layer onto the separator layer. In some examples, the second electrode layer may include a plurality of third active material particles and a plurality of third solid electrolyte buffer particles adhered together by a third binder, the third particles having a third average particle size (or other third particle distribution). In some examples, the third solid electrolyte buffer particles comprise a sulfide ceramic material. In some examples, the second electrode layer is conductive. In examples wherein the first electrode layer is an anode, the second electrode layer is a cathode. In this case, the third active material particles may comprise transition metals (for example, nickel, cobalt, manganese, copper, zinc, vanadium, chromium, iron), and their oxides, phosphates, phosphites, and silicates. The third active material particles may also include alkalines and alkaline earth metals, aluminum, aluminum oxides and aluminum phosphates, as well as halides and chalcogenides. In some examples, the cathode active material particles may comprise lithiated transition metal oxides. In examples wherein the first electrode layer is a cathode, the third electrode layer is an anode. In this case, the third active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the third active material particles comprise graphite and/or silicon.

Step 1110 of method 1100 includes forming interpenetrating finger structures between the electrode layers. In some examples, steps 1104, 1106, and 1108 may be performed substantially simultaneously. For example, the slurries may be extruded through their respective orifices simultaneously. This forms a three-layer slurry bead and coating on the moving substrate. In some examples, difference in viscosities, difference in surface tensions, difference in densities, difference in solids contents, and/or different solvents used between the adjacent active material slurries may be tailored to cause interpenetrating finger structures at the boundary between the first and second layer, and between the second and third layer. In some embodiments, the viscosities, surface tensions, densities, solids contents, and/or solvents may be substantially similar. Creation of interpenetrating structures, if desired, may be facilitated by turbulent flow at the wet interface between the first active material slurry and the second separator slurry, and between the second separator slurry and the third separator slurry, creating partial intermixing of the adjacent slurries. In some examples, the interpenetrating finger structures may have a length of at least 2 μm or at least twice the diameter of an average particle size of the first, second, or third solid electrolyte buffer particles.

Method 1100 may optionally include drying the composite electrode in step 1112. The first, second, and third layers may experience the drying process as a combined structure. In some examples, drying step 1112 includes a form of heating and energy transport to and from the electrode (e.g., convection, conduction, radiation) to expedite the drying process. Drying the composite electrode includes evaporating the solvent of the first, second, and third layers.

Method 1100 may optionally include calendering and/or hot compressing (e.g., in a hot roll process) the composite electrode in step 1114. The first, second, and third layers may experience the calendering process as a combined structure. In some examples, calendering is replaced with another compression, pressing, or compaction process. In some examples, calendering the electrode may be performed by pressing the combined layers against the substrate. In some examples, the composite electrode may be calendered at temperatures of no greater than 600° C. due to lower sintering temperatures of sulfide ceramic materials. In some examples, calendaring the composite electrode may sinter the solid electrolyte buffer particles, creating a dense, low-impedance system with low or zero porosity.

K. Illustrative Manufacturing System

Figure 13:
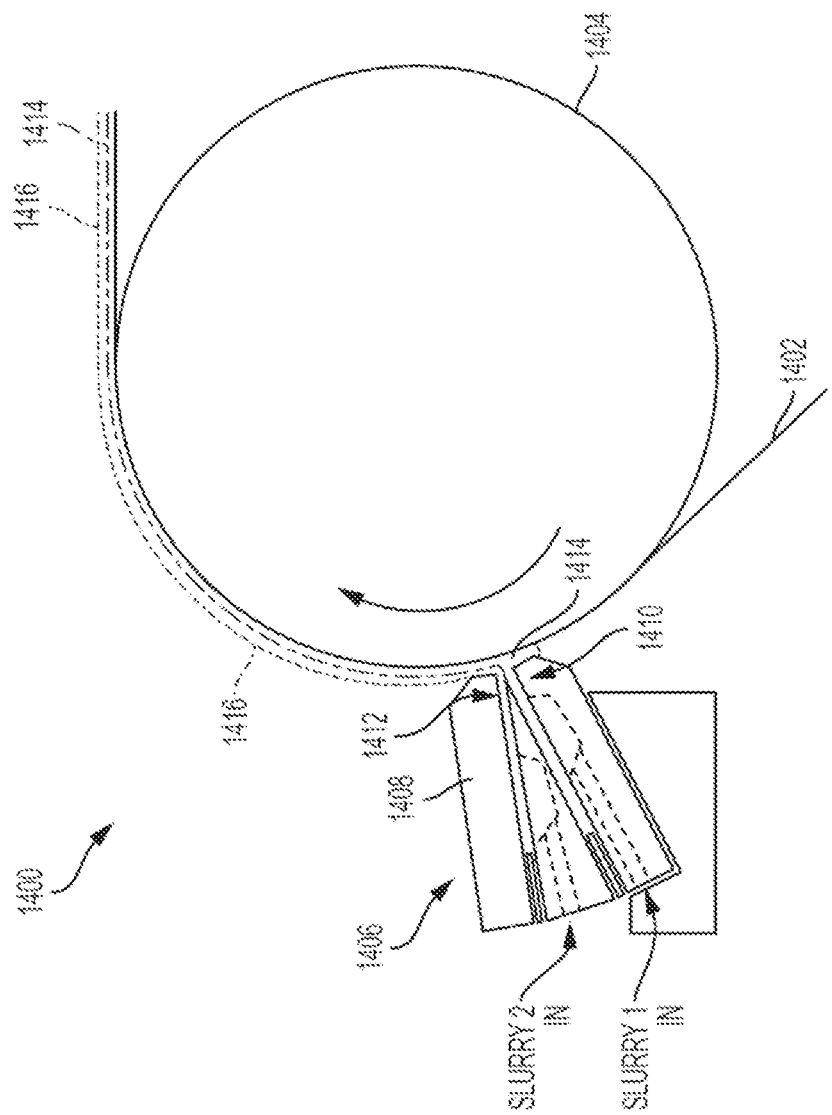
FIG. 13 is a schematic diagram of an illustrative manufacturing system including two die slots suitable for manufacturing electrodes and electrochemical cells of the present disclosure.
Figure 14:
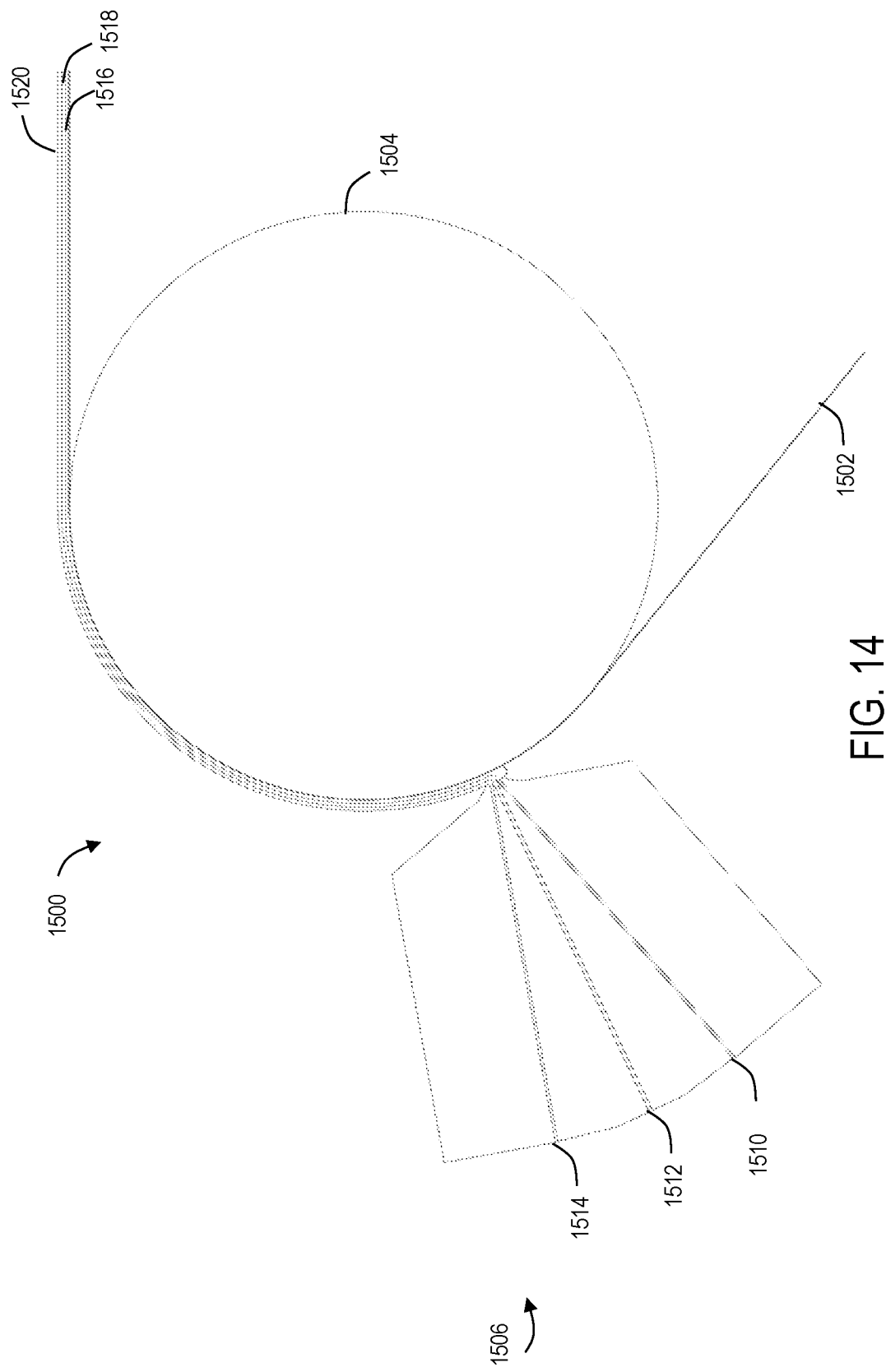
FIG. 14 is a schematic diagram of an illustrative manufacturing system including three die slots suitable for manufacturing electrodes and electrochemical cells of the present disclosure.

Turning to FIGS. 13 and 14, an illustrative manufacturing system 1400 for use with methods 800, 1000, and 1100 will now be described. In some examples, a slot-die coating head with at least two fluid slots, fluid cavities, fluid lines, and fluid pumps may be used to manufacture a battery electrode featuring an active material layer and an integrated separator layer (AKA a separator coating). In some examples, additional cavities may be used to create additional active material layers.

In system 1400, a foil substrate 1402 is transported by a revolving backing roll 1404 past a stationary dispenser device 1406. Dispenser device 1406 may include any suitable dispenser configured to evenly coat one or more layers of slurry onto the substrate. In some examples, the substrate may be held stationary while the dispenser head moves. In some examples, both may be in motion. Dispenser device 1406 may, for example, include a dual chamber slot die coating device having a coating head 1408 with two orifices 1410 and 1412. A slurry delivery system may supply two different slurries to the coating head under pressure. Due to the revolving nature of backing roll 1404, material exiting the lower orifice or slot 1410 will contact substrate 1402 before material exiting the upper orifice or slot 1412. Accordingly, a first layer 1414 will be applied to the substrate and a second layer 1416 will be applied on top of the first layer. In the present disclosure, the first layer 1414 may be the active material of an electrode and the second layer may be a separator layer.

Manufacturing methods 800, 1000, and 1100 may be performed using a dual-slot configuration, as depicted in FIG. 13, to simultaneously extrude the electrode material and the separator layers, or a multi-slot configuration with three or more dispensing orifices used to simultaneously extrude a multilayered electrode with an integrated separator layer, as depicted in FIG. 14.

In some embodiments, manufacturing system 1500 may include a tri-slot configuration, such that a three electrode layers may all be extruded simultaneously.

In manufacturing system 1500, a foil substrate 1502 is transported by a revolving backing roll 1504 past a stationary dispenser device 1506. Dispenser device 1506 may include any suitable dispenser configured to evenly coat one or more layers of slurry onto the substrate. In some examples, the substrate may be held stationary while the dispenser head moves. In some examples, both may be in motion. Dispenser device 1506 may, for example, include a three chamber slot die coating device having a coating head 1508 with three orifices 1510, 1512, and 1514. A slurry delivery system may supply three different slurries to the coating head under pressure. Due to the revolving nature of backing roll 1504, material exiting the lower orifice or slot 1510 will contact substrate 1502 before material exiting the central orifice or slot 1512. Similarly, material exiting central orifice or slot 1512 will contact material exiting lower orifice or slot 1510 before material exiting upper orifice or slot 1514. Accordingly, a first layer 1516 will be applied to the substrate, a second layer 1518 will be applied on top of the first layer, and a third layer 1520 will be applied on top of the second layer.

In some examples, a first active material layer, a second active material layer, and the separator layer may all be extruded simultaneously. In some examples, an active material layer, a first separator layer, and a second separator layer may all be extruded simultaneously. In some examples, an anode layer, a separator layer, and a cathode layer may all be extruded simultaneously. In another embodiment, subsequent layers may be applied after initial electrodes have first dried.

L. Illustrative Combinations and Additional Examples

This section describes additional aspects and features of solid-state electrodes having integrated sulfide separators, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A solid-state electrochemical cell comprising:
an anode; and
a cathode, the cathode comprising:
an aluminum current collector;
an electrically conductive composite cathode layer layered onto and directly contacting the aluminum current collector, and comprising a first plurality of cathode active particles mixed with a first plurality of solid electrolyte buffer material particles;
an electrically non-conductive solid electrolyte separator layer layered onto and directly contacting the electrically conductive composite cathode layer, and comprising a second plurality of solid electrolyte buffer material particles; and an interpenetrating boundary between the electrically conductive composite cathode layer and the electrically non-conductive solid electrolyte separator.

A1. The solid-state electrochemical cell of paragraph A0, wherein the first and second plurality of solid electrolyte buffer material particles comprise a sulfide ceramic.

A2. The solid-state electrochemical cell of paragraphs A0 or A1, wherein the electrically conductive composite cathode layer includes at least one polymeric binder.

A3. The solid-state electrochemical cell of any of paragraphs A0 through A2, wherein an average grain size of the first plurality of solid electrolyte buffer material particles is smaller than an average particle size of the first plurality of cathode active particles.

A4. The solid-state electrochemical cell of any of paragraphs A0 through A3, wherein the first plurality of cathode active material particles comprise a lithiated transition metal oxide.

A5. The solid-state electrochemical cell of any of paragraphs A0 through A4, wherein the anode comprises lithium metal.

A6. The solid-state electrochemical cell of paragraph A5, wherein the anode comprises a metallic lithium foil.

A7. The solid-state electrochemical cell of paragraph A5 or A6, wherein the anode is deposited in-situ onto a copper foil current collector.

B0. A method of manufacturing a cathode for a solid-state electrochemical cell, the method comprising:
depositing a first electrically conductive cathode composite slurry layer including a plurality of first cathode active material particles, a first plurality of solid electrolyte buffer particles, and a first binder material onto an aluminum substrate;
depositing a second electrically non-conductive separator slurry layer including a second plurality of solid electrolyte buffer particles and a second binder material onto the first electrically conductive cathode composite slurry layer; and
forming interpenetrating fingers between the first electrically conductive cathode composite layer and the second electrically non-conductive separator slurry layer.

B1. The method of paragraph B0, further comprising drying a solvent of the first electrically conductive cathode composite slurry layer and the second electrically non-conductive separator slurry layer.

B2. The method of paragraph B0 or B1, further comprising hot compressing the cathode.

B3. The method of any of paragraphs B0 through B2, wherein the interpenetrating fingers have a length of at least 2 μm.

B4. The method of any of paragraphs B0 through B2, wherein the interpenetrating fingers have a length of at least twice the average diameter of the second plurality of solid electrolyte buffer particles.

B5. The method of paragraph B2, wherein the cathode is hot compressed at a temperature no greater than 600° C.

B6. The method of any of paragraphs B0 through B5, wherein the first plurality and the second plurality of solid electrolyte buffer particles comprise sulfide ceramics.

B7. The method of any of paragraphs B0 through B6, wherein the first electrically conductive cathode composite slurry layer further comprises a plurality of conductive additive particles intermixed with the plurality of first cathode active material particles.

C0. An electrode for a solid-state electrochemical cell comprising:
a current collector;
a first electrically conductive electrode layer layered onto and directly contacting the current collector, the first electrode layer including a first plurality of active material particles mixed with a first plurality of solid electrolyte buffer particles;
a first electrically non-conductive separator layer layered onto and directly contacting the first electrode layer, the first separator layer including a second plurality of sold electrolyte buffer particles; and
an interpenetrating boundary between the electrically conductive composite cathode layer and the first electrically non-conductive solid electrolyte separator.

C1. The electrode of paragraph C0, wherein the first and second pluralities of solid electrolyte buffer particles comprise a sulfide ceramic.

C2. The electrode of paragraph C0 or C1, further comprising:
a second electrically non-conductive separator layer layered onto and directly contacting the first separator layer, the second separator layer including a third plurality of solid electrolyte buffer particles; and
an interpenetrating boundary between the first separator layer and the second separator layer.

C3. The electrode of paragraph C2, wherein the third plurality of solid electrolyte buffer particles comprise a sulfide ceramic.

C4. The electrode of any of paragraphs C0 through C3, wherein an average grain size of the first plurality of solid electrolyte buffer material particles is smaller than an average particle size of the first plurality of active particles.

C5. The electrode of any of paragraphs C0 through C4, wherein the electrode is a cathode, and wherein the first plurality of active material particles comprise a lithiated transition metal oxide.

C6. The electrode of any of paragraphs C0 through C5, wherein the electrode is an anode, and wherein the first plurality of active material particles comprise silicon, silicon oxide, or graphite.

D0. An electrode for a solid-state electrochemical cell, the electrode including:
 a current collector;
 an electrically conductive electrode layer layered onto and directly contacting the current collector, the first electrode layer, and comprising a first plurality of active particles mixed with a first plurality of solid electrolyte buffer material particles;
 an electrically non-conductive solid electrolyte separator layer layered onto and directly contacting the electrically conductive electrode layer layer, and comprising a second plurality of solid electrolyte buffer material particles; and
 an interpenetrating boundary between the electrically conductive electrode layer and the electrically non-conductive solid electrolyte separator.

D1. The electrode of paragraph D0, wherein the first and second plurality of solid electrolyte buffer material particles comprise a sulfide ceramic.

D2. The electrode of paragraphs D0 or D1, wherein the electrically conductive electrode layer includes at least one polymeric binder.

D3. The electrode of any of paragraphs D0 through D2, wherein an average grain size of the first plurality of solid electrolyte buffer material particles is smaller than an average particle size of the first plurality of active particles.

D4. The electrode of any of paragraphs D0 through D3, wherein the electrode is a cathode.

D5. The electrode of paragraph D4, wherein the first plurality of active material particles comprise a lithiated transition metal oxide.

D6. The electrode of any of paragraphs D0 through D3, wherein the electrode is an anode.

D7. The electrode of paragraph D6, wherein the first plurality of active material particles comprise silicon or graphite.

E0. A solid-state electrochemical cell comprising:
 a current collector;
 an electrically conductive cathode layer layered onto and directly contacting the current collector, the conductive cathode layer comprising a plurality of cathode active material particles mixed with a first plurality of solid electrolyte buffer material particles;
 an electrically non-conductive integrated separator layer layered onto and directly contacting the conductive cathode layer, the non-conductive integrated separator layer comprising a second plurality of solid electrolyte buffer material particles;
 an electrically conductive anode layer layered onto and directly contacting the non-conductive integrated separator layer, the conductive anode layer comprising a plurality of anode active material particles mixed with a third plurality of solid electrolyte buffer material particles;
 a first interpenetrating boundary between the conductive cathode layer and the non-conductive integrated separator layer; and
 a second interpenetrating boundary between the non-conductive integrated separator layer and the conductive anode layer.

Advantages, Features, and Benefits

The different embodiments and examples of the solid-state electrode having an integrated sulfide separator described herein provide several advantages over known solutions for solid-state electrochemical cells. For example, illustrative embodiments and examples described herein promote increased adhesion between integrated ceramic separators and electrodes.

Additionally, and among other benefits, illustrative embodiments and examples described herein provide solid-state electrodes with increased ionic conductivity.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method of manufacturing a cathode for a solid-state electrochemical cell, the method comprising:
 depositing a first electrically conductive cathode composite slurry layer including a plurality of first cathode active material particles, a first plurality of solid electrolyte buffer particles, and a first binder material, onto an aluminum substrate, wherein the first plurality of solid electrolyte buffer particles comprises sulfide ceramic particles;
 depositing a second electrically non-conductive separator slurry layer including a second plurality of solid electrolyte buffer particles and a second binder material onto the first electrically conductive cathode composite slurry layer;
 forming first interpenetrating fingers between the first electrically conductive cathode composite slurry layer, wherein the second plurality of solid electrolyte buffer particles comprises sulfide ceramic particles and the second electrically non-conductive separator slurry layer; and
 sintering the first plurality of solid electrolyte buffer particles and the second plurality of solid electrolyte buffer particles at a temperature no greater than 600° C by compressing the cathode with a heated roller.

2. The method of claim 1, further comprising drying a solvent of the first electrically conductive cathode composite slurry layer and the second electrically non-conductive separator slurry layer.

3. The method of claim 1, wherein the first interpenetrating fingers have a length of at least twice an average diameter of the second plurality of solid electrolyte buffer particles.

4. The method of claim 1, wherein the first plurality and the second plurality of solid electrolyte buffer particles comprise sulfide ceramics.

5. The method of claim 1, wherein the first electrically conductive cathode composite slurry layer further comprises a plurality of conductive additive particles intermixed with the plurality of first cathode active material particles.

6. The method of claim 1, further comprising:
 depositing a third electrically non-conductive separator slurry layer including a third plurality of solid electrolyte buffer particles and a third binder material onto the second electrically non-conductive separator slurry layer; and
 forming second interpenetrating fingers between the second electrically non-conductive separator slurry layer and the third electrically non-conductive separator slurry layer.

7. The method of claim 6, further comprising drying a solvent of the first electrically conductive cathode composite slurry layer, the second electrically non-conductive separator slurry layer, and the third electrically non-conductive separator slurry layer.

8. The method of claim 6, further comprising sintering the third plurality of solid electrolyte buffer particles by compressing the cathode with the heated roller.

9. The method of claim 6, wherein the first interpenetrating fingers have a length of at least twice an average diameter of the second plurality of solid electrolyte buffer particles.

10. The method of claim 6, wherein the third plurality of solid electrolyte buffer particles comprises sulfide ceramic particles.

* * * * *

UNITED STATES PATENT AND TRADEMARK OFFICE
CERTIFICATE OF CORRECTION

PATENT NO. : 11,973,213 B2
APPLICATION NO. : 17/703719
DATED : April 30, 2024
INVENTOR(S) : Adrian Yao It is certified that error appears in the above-identified patent and that said Letters Patent is hereby corrected as shown below:

In the Claims

Column 32, Line 57, Claim 1: the text "slurry layer" should read --slurry layer, wherein the second plurality of solid electrolyte buffer particles comprises sulfide ceramic particles--.

Column 32, Line 59, Claim 1: the text "electrically conductive cathode composite slurry layer, wherein the second plurality of solid electrolyte buffer particles comprises sulfide ceramic particles and the second electrically non-conductive separator slurry layer" should read --electrically conductive cathode composite slurry layer and the second electrically non-conductive separator slurry layer--.

Signed and Sealed this
Twenty-third Day of July, 2024

Katherine Kelly Vidal
*Director of the United States Patent and Trademark Office*